United States Patent
Li et al.

(10) Patent No.: US 11,329,708 B2
(45) Date of Patent: May 10, 2022

(54) CHANNEL STATE INFORMATION FEEDBACK METHOD AND DEVICE

(71) Applicant: CHINA ACADEMY OF TELECOMMUNICATIONS TECHNOLOGY, Beijing (CN)

(72) Inventors: Hui Li, Beijing (CN); Qiubin Gao, Beijing (CN); Runhua Chen, Beijing (CN); Wenhong Chen, Beijing (CN); Rakesh Tamrakar, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 783 days.

(21) Appl. No.: 16/081,878

(22) PCT Filed: Feb. 21, 2017

(86) PCT No.: PCT/CN2017/074248
§ 371 (c)(1),
(2) Date: Aug. 31, 2018

(87) PCT Pub. No.: WO2017/152749
PCT Pub. Date: Sep. 14, 2017

(65) Prior Publication Data
US 2021/0218456 A1    Jul. 15, 2021

(30) Foreign Application Priority Data
Mar. 11, 2016  (CN) .......................... 201610140712.2

(51) Int. Cl.
*H04B 7/06* (2006.01)
*H04B 7/0456* (2017.01)

(52) U.S. Cl.
CPC ......... *H04B 7/0639* (2013.01); *H04B 7/0486* (2013.01); *H04B 7/0617* (2013.01); *H04B 7/0634* (2013.01)

(58) Field of Classification Search
CPC .. H04B 7/0478; H04B 7/0639; H04B 7/0663; H04B 7/028; H04B 7/0626;
(Continued)

(56) References Cited

U.S. PATENT DOCUMENTS

2012/0269290 A1* 10/2012 Onggosanusi .... H04L 25/03343
375/296
2013/0022144 A1*  1/2013 Kotecha ................ H04W 52/08
375/267
(Continued)

FOREIGN PATENT DOCUMENTS

CN    102404084 A    4/2012
CN    102447523 A    5/2012
(Continued)

OTHER PUBLICATIONS

"Adaptive Feedback Rate Control for Massive MIMO System in LTE"; Chen et al.; 2015 IEEE 26th Annual International Symposium on Personal, Indoor, and Mobile Radio Communications (PIMRC); available Sep. 2, 2015 (Year: 2015).*
(Continued)

*Primary Examiner* — Benjamin H Elliott, IV
(74) *Attorney, Agent, or Firm* — Ladas & Parry, LLP

(57) ABSTRACT

A CSI feedback method and a CSI feedback device are provided. The CSI feedback method includes: determining a first precoding matrix in a set of first precoding matrices, and determining a first precoding matrix index value corresponding to the first precoding matrix; determining a second precoding matrix in a set of second precoding matrices, and determining a second precoding matrix index value corre-
(Continued)

sponding to the second precoding matrix, the second precoding matrix including a beam selection section for selecting beams from the beam groups for each antenna group and a phase adjustment section for adjusting phases among the plurality of antenna groups; and feeding back the first precoding matrix index value and the second precoding matrix index value to an access device, so as to enable the access device to select corresponding precoding matrices from the set of first precoding matrices and the set of second precoding matrix in accordance with the first precoding matrix index value and the second precoding matrix index value, and implement calculation on the selected precoding matrices to obtain a precoding matrix for data transmission.

18 Claims, 3 Drawing Sheets

(58) Field of Classification Search
CPC .. H04B 7/0617; H04B 7/0486; H04B 7/0634; H04L 25/03343; H04L 2025/03808; H04L 25/03949; H04L 25/03904; H04L 25/03917; H04L 1/0693; H04L 1/0073; H04L 1/0026; H01Q 21/00; H01Q 3/30
See application file for complete search history.

(56) References Cited

U.S. PATENT DOCUMENTS

| | | | | |
|---|---|---|---|---|
| 2013/0058424 | A1* | 3/2013 | Enescu | H04L 25/03936 375/267 |
| 2013/0094464 | A1* | 4/2013 | Li | H04W 72/0413 370/329 |
| 2013/0170578 | A1* | 7/2013 | Wu | H04B 7/0456 375/295 |
| 2014/0177745 | A1* | 6/2014 | Krishnamurthy | H04B 7/0413 375/267 |
| 2014/0226702 | A1* | 8/2014 | Onggosanusi | H04B 7/0478 375/219 |
| 2014/0254701 | A1* | 9/2014 | Geirhofer | H04B 7/0469 375/267 |
| 2015/0244438 | A1* | 8/2015 | Ding | H04L 1/00 375/267 |
| 2015/0341093 | A1* | 11/2015 | Ji | H04B 7/0478 375/267 |
| 2016/0013845 | A1* | 1/2016 | Onggosanusi | H04B 7/0456 375/267 |
| 2016/0323022 | A1* | 11/2016 | Rahman | H04B 7/0469 |
| 2016/0344458 | A1* | 11/2016 | Zhao | H04B 7/0456 |
| 2018/0026687 | A1* | 1/2018 | Rahman | H04B 7/0639 375/267 |
| 2018/0167117 | A1* | 6/2018 | Liu | H04B 7/063 |
| 2018/0198497 | A1* | 7/2018 | Wei | H04B 7/0478 |

FOREIGN PATENT DOCUMENTS

| | | |
|---|---|---|
| CN | 102868477 A | 1/2013 |
| CN | 103220080 A | 7/2013 |
| CN | 103684657 A | 3/2014 |
| CN | 104811229 A | 7/2015 |
| CN | 105027463 A | 11/2015 |
| KR | 20150097774 A | 8/2015 |
| KR | 20150134736 A | 12/2015 |
| WO | 2012043202 A1 | 4/2012 |
| WO | 2015178699 A1 | 11/2015 |
| WO | WO-2017152749 A1 * | 9/2017 ........... H04B 7/0478 |

OTHER PUBLICATIONS

"Hybrid CSI-RS Transmission Mechanism-Based 3D Beamforming Scheme for FDD Massive MIMO System"; Zhang et al.; China Communications ( vol. 13, Issue: Supplement2, 2016) (Year: 2016).*
"Practical Channel Acquisition for Massive MIMO Systems in LTE"; Chen et al.; 2015 International Conference on Computing, Networking and Communications (ICNC); available Feb. 19, 2015 (Year: 2015).*
"Codebook Design for Massive MIMO Systems in LTE"; Li et al.; 2016 IEEE 83rd Vehicular Technology Conference (VTC Spring); available May 18, 2016 (Year: 2016).*
Notification of Reason for Refusal from KR app. No. 10-2018-7029063, dated Jan. 17, 2020, with English translation from KIPO.
International Search Report for PCT/CN2017/074248 dated May 12, 2017 and its English translation provided by WIPO.
Written Opinion of the International Search Authority PCT/CN2017/074248 dated May 12, 2017 and its English translation provided by Google Translate.
First Office Action and search report from CN app. No. 201610140712.2, dated Sep. 23, 2019, with English translation from Global Dossier.
Notice of Reasons for Refusal from JP app. No. 2018547412, dated Nov. 5, 2019, with English translation from Global Dossier.
"FD-MIMO Class A Codebook Design", R1-155678, 3GPP TSG-RAN WG1#82bis, Malmö, Sweden, Oct. 5-9, 2015.
From TW App. No. 106106771, Office Action dated Feb. 27, 2018, with machine English translation.
From EP App. No. 17762435.0, Extended European Search Report dated Jan. 7, 2019.
From PCT/CN2017/074248, Written Opinion of the International Searching Authority, dated May 12, 2017, with English translation from WIPO.
From PCT/CN2017/074248, International Preliminary Report on Patentability, dated Sep. 11, 2018, with English translation from WIPO.

\* cited by examiner

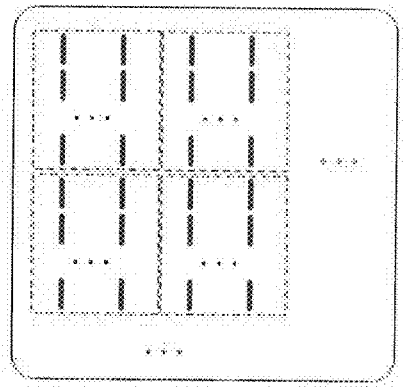

Fig. 4A

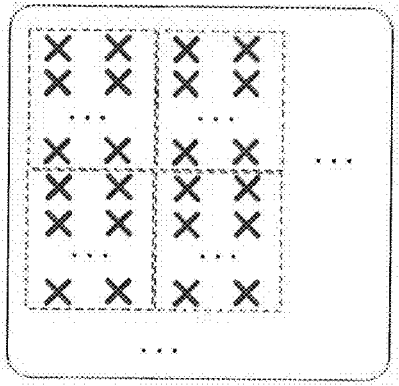

Fig. 4B receiving a first precoding matrix index value and a second precoding matrix index value from a UE, the first precoding matrix index value corresponding to a first precoding matrix $W_1$ in a first set of precoding matrices determined by the UE, the first precoding matrix $W_1$ consisting of beam groups for a plurality of antenna groups of an antenna array, the second precoding matrix index value corresponding to a second precoding matrix $W_2$ in a second set of precoding matrices determined by the UE, the second precoding matrix $W_2$ including a beam selection section for selecting beams from the beam groups for each antenna group and a phase adjustment section for adjusting phase g among the plurality of antenna groups — S501 selecting corresponding precoding matrices from the first set of precoding matrices and the second set of precoding matrices in accordance with the first precoding matrix index value and the second precoding matrix index value, and calculating the selected precoding matrices to obtain a precoding matrix W for data transmission — S502

Fig. 5

CHANNEL STATE INFORMATION FEEDBACK METHOD AND DEVICE

CROSS-REFERENCE TO RELATED APPLICATIONS

The present application is the U.S. national phase of PCT Application PCT/CN2017/074248 filed on Feb. 21, 2017 which claims the priority to Chinese patent application No. 201610140712.2 filed on Mar. 11, 2016, the disclosures of which are incorporated herein by reference in their entireties.

TECHNICAL FIELD

The present disclosure relates to the field of communication technology, in particular to a Channel State Information (CSI) feedback method and a CSI feedback device.

BACKGROUND

In a Long Term Evolution (LTE) Release-10 (Rel-10) system, two levels of codebooks are introduced with respect to 8 antenna ports at a base station end. In an LTE Rel-12 system, two levels of codebooks are also introduced with respect to 4 antenna ports at the base station end. In an LTE Rel-13 system, a Full Dimension Multi-Input-Multi-Output (FD MIMO) antenna array (as shown in FIGS. 1 and 2) is adopted at the base station end with 16 antenna ports arranged in a one-dimension or two-dimensional manner.

Based on the configuration of the antenna array, for a codebook design, the original two levels of codebooks with respect to the 4 antenna ports and the 8 antenna ports are extended to two-dimensional, two levels of codebooks. This codebook structure may be directly extended so as to be used for more antenna ports.

In a multi-antenna system on the basis of a linear precoding technique, a receiver selects an appropriate precoding matrix from a predefined set of precoding matrices in accordance with channel information and transmits an index of the selected precoding matrix in the set to a transmitter, and this set is just called as codebook. The transmitter determines the corresponding precoding matrix in accordance with the received index, and performs appropriate preprocessing on a signal to be transmitted therefrom, so as to improve the validity and reliability of the information transmission. During the above procedure, the codebook is an essential element. The codebook needs to be designed in such a manner as to match a channel distribution characteristic and minimize the performance loss caused by codebook quantization as possible.

However, there is at least the following defect in the related art. The above-mentioned codebook structure is designed by taking the antenna array as a whole, and a difference between channels for different sections of the antenna array is not taken into consideration. During the feedback of CSI on the basis of the codebook, certain performance loss may occur due to the inaccurate channel quantization.

SUMMARY

An object of the present disclosure is to provide a CSI feedback method and a CSI feedback device, so as to divide an antenna array into more groups on the basis of a division mode of the antenna array, and transmit information in a two-level feedback mode, thereby to quantize the channel in a more accurate manner and improve the system performance.

In one aspect, the present disclosure provides in some embodiments a CSI feedback method, including: determining a first precoding matrix $W_1$ in a set of first precoding matrices, and determining a first precoding matrix index value corresponding to the first precoding matrix $W_1$, the first precoding matrix $W_1$ consisting of beam groups for a plurality of antenna groups of an antenna array; determining a second precoding matrix $W_2$ in a set of second precoding matrices, and determining a second precoding matrix index value corresponding to the second precoding matrix $W_2$, the second precoding matrix $W_2$ including a beam selection section for selecting beams from the beam groups for each antenna group and a phase adjustment section for adjusting phases among the plurality of antenna groups; and feeding back the first precoding matrix index value and the second precoding matrix index value to an access device, selecting, by the access device, corresponding precoding matrices from the set of first precoding matrices and the set of second precoding matrix in accordance with the first precoding matrix index value and the second precoding matrix index value, and implementing calculation on the selected precoding matrices to obtain a precoding matrix W for data transmission.

In a possible embodiment of the present disclosure, the precoding matrix W is calculated using the following equation:

$$W = W_1 W_2 = \begin{bmatrix} X_0 & & & & 0 \\ & X_1 & & & \\ & & X_2 & & \\ & & & \ddots & \\ 0 & & & & X_{M-1} \end{bmatrix} \cdot W_2.$$

The first precoding matrix $W_1$ is a block diagonal matrix including elements of 0 other than diagonal blocks where a beam group matrix $X_i$ is located, $i=0, 1, \ldots, M-1$, M represents the quantity of the antenna groups for the antenna array, $X_i$ represents a beam group for an $i^{th}$ antenna group and it is a $N_i \times L_i$ matrix with each column representing one beam direction, $N_i$ represents the quantity of antenna elements in the $i^{th}$ antenna group, N represents a total quantity of antenna elements for the antenna array and $$N = \sum_{i=0}^{M-1} N_i,$$

and $L_i$ represents the quantity of beams in the beam group for the $i^{th}$ antenna group. The second precoding matrix $W_2$ is used for beam selection and phase adjustment, and it is capable of selecting several beams from each beam group and adjusting a phase among the selected beams for each antenna group, to acquire a final precoding matrix. The second precoding matrix $W_2$ is a $$\left( \sum_{i=0}^{M-1} L_i \right) \times r$$

matrix, where r represents a rank of the precoding matrix W.

In a possible embodiment of the present disclosure, $$W'_2 = \begin{bmatrix} E_0 & & & & 0 \\ & E_1 & & & \\ & & E_2 & & \\ & & & \ddots & \\ 0 & & & & E_{M-1} \end{bmatrix} \cdot W_p,$$

where $$\begin{bmatrix} E_0 & & & & 0 \\ & E_1 & & & \\ & & E_2 & & \\ & & & \ddots & \\ 0 & & & & E_{M-1} \end{bmatrix}$$

represents the beam selection section and is to select $r_1$ beams from each antenna group, a beam selection vector for the $i^{th}$ antenna group is defined as $E_i = [e_{i,0} \ e_{i,1} \ \ldots \ e_{i,r_1-1}]$, where $e_{i,j}$ represents a column selection vector having a length of $L_i$ and it is to select one beam from the beam group matrix $X_i$ or merge the beams in $X_i$ into one beam, $j=0, 1, \ldots r_1-1$, $W_p$ represents the phase adjustment section, and r columns of $W_2'$ are selected as the second precoding matrix $W_2$.

In a possible embodiment of the present disclosure, when the $r_1$ beams are orthogonal to each other, $W_p = U \otimes I_{r_1}$, where U represents an orthogonal matrix including $r_2$ columns, each column includes M phase adjustment factors, $r_2$ is a minimum integer greater than or equal to $$\frac{r}{r_1},$$

$I_{r_1}$ represents a $r_1 \times r_1$ unit matrix. When the $r_1$ beams are not orthogonal to each other, every $r_1$ groups of M antenna groups form $$\frac{M}{r_1}$$

superior groups, and $W_p = U \otimes V$, where U represents an orthogonal matrix for adjusting phases among the superior groups and including $r_2$ columns, each column includes $$\frac{M}{r_1}$$

phase adjustment factors, $r_2$ is a minimum integer greater than or equal to $$\frac{r}{r_1},$$

V is used for adjusting a phase among the antenna groups in one superior group and $V = [V'(:,1) \otimes e_{r_1}^{(1)} \ V'(:,2) \otimes e_{r_1}^{(2)} \ \ldots \ V'(:,r_1) \otimes e_{r_1}^{(r_1)}]$, V' represents an orthogonal matrix including $r_1$ columns, each column includes $r_1$ phase adjustment factors, $V'(:,i)$ represents an $i^{th}$ column of V', and e) represents an $i^{th}$ column of a unit matrix $I_{r_1 \times r_1}$.

In a possible embodiment of the present disclosure, the quantity M of the antenna groups of the antenna array varies along with the rank r of the precoding matrix W.

In a possible embodiment of the present disclosure, the CSI feedback method further includes: acquiring a channel measurement result, and determining codebook parameters of a codebook in accordance with the channel measurement result, a set of the first precoding matrices $W_1$ forming a first codebook, a set of the second precoding matrices $W_2$ forming a second codebook, a set of the precoding matrices for data transmission acquired after the calculation forming the codebook; and feeding back the codebook parameters to the access device, or determining one or more parameters corresponding to the codebook parameters in accordance with a predetermined mapping relationship between the codebook parameters and the one or more parameters and feeding back the one or more parameters to the access device.

In a possible embodiment of the present disclosure, the CSI feedback method further includes: receiving one or more parameters from the access device; and determining codebook parameters corresponding to the one or more parameters in accordance with a predetermined mapping relationship between the codebook parameters and the one or more parameters, or receiving all the codebook parameters from the access device.

In a possible embodiment of the present disclosure, the codebook parameters include one or more of the quantities: quantity M of the antenna groups of the antenna array, a grouping mode of the antenna groups of the antenna array, the quantity $N_i$ of the antenna elements in each antenna group, the quantity of rows and columns of the antenna elements in each antenna group, a sampling rate of the beams in the precoding matrix, and a constitution mode of the beam groups for each antenna group in $W_1$.

In another aspect, the present disclosure provides in some embodiments a CSI feedback method, including: receiving a first precoding matrix index value and a second precoding matrix index value from a User Equipment (UE), the first precoding matrix index value corresponding to a first precoding matrix $W_1$ in a set of first precoding matrices determined by the UE, the first precoding matrix $W_1$ consisting of beam groups for a plurality of antenna groups of an antenna array, the second precoding matrix index value corresponding to a second precoding matrix $W_2$ in a set of second precoding matrices determined by the UE, the second precoding matrix $W_2$ including a beam selection section for selecting beams from the beam groups for each antenna group and a phase adjustment section for adjusting phases among the plurality of antenna groups; and selecting corresponding precoding matrices from the set of first precoding matrices and the set of second precoding matrices in accordance with the first precoding matrix index value and the second precoding matrix index value, and implementing calculation on the selected precoding matrices to obtain a precoding matrix W for data transmission.

In a possible embodiment of the present disclosure, the CSI feedback method further includes: constructing a set of the first precoding matrices $W_1$ to obtain a first codebook and constructing a set of the second precoding matrices $W_2$ to obtain a second codebook; and acquiring a codebook in accordance with the matrices in the first codebook and the second codebook through calculation.

In a possible embodiment of the present disclosure, the CSI feedback method further includes notifying the UE of codebook parameters of the codebook. The codebook parameters include one or more of the quantities: quantity M of the antenna groups of the antenna array, a grouping mode of the antenna groups of the antenna array, the quantity $N_i$ of antenna elements in each antenna group, the quantity of rows and columns of the antenna elements in each antenna group, a sampling rate of the beams in the precoding matrix, and a constitution mode of the beam groups for each antenna group in $W_1$.

In yet another aspect, the present disclosure provides in some embodiments a CSI feedback device, including: a first determination module configured to determine a first precoding matrix $W_1$ in a set of first precoding matrices, and determine a first precoding matrix index value corresponding to the first precoding matrix $W_1$, the first precoding matrix $W_1$ consisting of beam groups for a plurality of antenna groups of an antenna array; a second predetermined module configured to determine a second precoding matrix $W_2$ in a set of second precoding matrices, and determine a second precoding matrix index value corresponding to the second precoding matrix $W_2$, the second precoding matrix $W_2$ including a beam selection section for selecting beams from the beam groups for each antenna group and a phase adjustment section for adjusting phases among the plurality of antenna groups; and a first feedback module configured to feed back the first precoding matrix index value and the second precoding matrix index value to an access device, so as to enable the access device to select corresponding precoding matrices from the set of first precoding matrices and the set of second precoding matrix in accordance with the first precoding matrix index value and the second precoding matrix index value, and implement calculation on the selected precoding matrices to obtain a precoding matrix W for data transmission.

In a possible embodiment of the present disclosure, the precoding matrix W is calculated using the following equation:

$$W = W_1 W_2 = \begin{bmatrix} X_0 & & & & 0 \\ & X_1 & & & \\ & & X_2 & & \\ & & & \ddots & \\ 0 & & & & X_{M-1} \end{bmatrix} \cdot W_2.$$

The first precoding matrix $W_1$ is a block diagonal matrix including elements of 0 other than diagonal blocks where a beam group matrix $X_i$ is located, i=0, 1, ..., M−1, M represents the quantity of the antenna groups for the antenna array, $X_i$ represents a beam group for an $i^{th}$ antenna group and it is a $N_i \times L_i$ matrix with each column representing one beam direction, $N_i$ represents the quantity of antenna elements in the $i^{th}$ antenna group, N represents a total quantity of antenna elements for the antenna array and $$N = \sum_{i=0}^{M-1} N_i,$$

and $L_i$ represents the quantity of beams in the beam group for the $i^{th}$ antenna group. The second precoding matrix $W_2$ is used for beam selection and phase adjustment, and it is capable of selecting several beams from each beam group and adjusting a phase among the selected beams for each antenna group, to acquire a final precoding matrix. The second precoding matrix $W_2$ is a $$\left( \sum_{i=0}^{M-1} L_i \right) \times r$$

matrix, where r represents a rank of the precoding matrix W.

In a possible embodiment of the present disclosure, $$W_2' = \begin{bmatrix} E_0 & & & & 0 \\ & E_1 & & & \\ & & E_2 & & \\ & & & \ddots & \\ 0 & & & & E_{M-1} \end{bmatrix} \cdot W_p, \text{ where}$$

$$\begin{bmatrix} E_0 & & & & 0 \\ & E_1 & & & \\ & & E_2 & & \\ & & & \ddots & \\ 0 & & & & E_{M-1} \end{bmatrix}$$

represents the beam selection section and is to select $r_1$ beams from each antenna group, a beam selection vector for the $i^{th}$ antenna group is defined as $E_i = [e_{i,0} \ e_{i,1} \ \ldots \ e_{i,r_1-1}]$, where $e_{i,j}$ represents a column selection vector having a length of $L_i$ and it is to select one beam from the beam group matrix $X_i$ or merge the beams in $X_i$ into one beam, j=0, 1, ..., $r_1$−1, $W_p$ represents the phase adjustment section, and r columns of $W_2'$ are selected as the second precoding matrix $W_2$.

In a possible embodiment of the present disclosure, when the $r_1$ beams are orthogonal to each other, $W_p = U \otimes I_{r_1}$ where U represents an orthogonal matrix including $r_2$ columns, each column includes M phase adjustment factors, $r_2$ is a minimum integer greater than or equal to $$\frac{r}{r_1},$$

$I_{r_1}$ represents a $r_1 \times r_1$ unit matrix. When the $r_1$ beams are not orthogonal to each other, every $r_1$ groups of M antenna groups form $$\frac{M}{r_1}$$

superior groups, and $W_p = U \otimes V$, where U represents an orthogonal matrix for adjusting a phase among the superior groups and including $r_2$ columns, each column includes $$\frac{M}{r_1}$$

phase adjustment factors, $r_2$ is a minimum integer greater than or equal to $$\frac{r}{r_1},$$

V is for adjusting phases among the antenna groups in one superior group and $V=[V'(:,1)\otimes e_{r_1}^{(1)}\ V'(:,2)\otimes e_{r_1}^{(2)}\ \ldots\ V'(:,r_1)\otimes e_{r_1}^{(r_1)}]$, represents an orthogonal matrix including $r_1$ columns, each column includes $r_1$ phase adjustment factors, $V'(:,i)$ represents an $i^{th}$ column of $V'$, and $e_{r_1}^{(i)}$ represents an $i^{th}$ column of a unit matrix $I_{r_1\times r_1}$.

In a possible embodiment of the present disclosure, the quantity M of the antenna groups of the antenna array varies along with the rank r of the precoding matrix W.

In a possible embodiment of the present disclosure, the CSI feedback device further includes a first codebook parameter processing module configured to acquire a channel measurement result, determine codebook parameters of a codebook in accordance with the channel measurement result, and feedback the codebook parameters to the access device, or determine one or more parameters corresponding to the codebook parameters in accordance with a predetermined mapping relationship between the codebook parameters and the one or more parameters and feedback the one or more parameters to the access device. A set of the first precoding matrices $W_1$ form a first codebook, a set of the second precoding matrices $W_2$ form a second codebook, and a set of the precoding matrices for data transmission acquired after the calculation form the codebook.

In a possible embodiment of the present disclosure, the CSI feedback device further includes a second codebook parameter processing module configured to receive one or more parameters from the access device, and determine codebook parameters corresponding to the one or more parameters in accordance with a predetermined mapping relationship between the codebook parameters and the one or more parameters or receive all the codebook parameters from the access device.

In a possible embodiment of the present disclosure, the codebook parameters include one or more of the quantities: quantity M of the antenna groups of the antenna array, a grouping mode of the antenna groups of the antenna array, the quantity $N_i$ of the antenna elements in each antenna group, the quantity of rows and columns of the antenna elements in each antenna group, a sampling rate of the beams in the precoding matrix, and a constitution mode of the beam groups for each antenna group in $W_1$.

In still yet another aspect, the present disclosure provides in some embodiments a CSI feedback device, including: a second feedback module configured to receive a first precoding matrix index value and a second precoding matrix index value from a UE, the first precoding matrix index value corresponding to a first precoding matrix $W_1$ in a set of first precoding matrices determined by the UE, the first precoding matrix $W_1$ consisting of beam groups for a plurality of antenna groups of an antenna array, the second precoding matrix index value corresponding to a second precoding matrix $W_2$ in a set of second precoding matrices determined by the UE, the second precoding matrix $W_2$ including a beam selection section for selecting beams from the beam groups for each antenna group and a phase adjustment section for adjusting a phase among the plurality of antenna groups; and a precoding matrix selection module configured to select corresponding precoding matrices from the set of first precoding matrices and the set of second precoding matrices in accordance with the first precoding matrix index value and the second precoding matrix index value, and implement calculation on the selected precoding matrices to obtain a precoding matrix W for data.

In a possible embodiment of the present disclosure, the CSI feedback device further includes a third feedback module configured to notify the UE of codebook parameters of a codebook. The codebook parameters include one or more of the quantities: quantity M of the antenna groups of the antenna array, a grouping mode of the antenna groups of the antenna array, the quantity $N_i$ of antenna elements in each antenna group, the quantity of rows and columns of the antenna elements in each antenna group, a sampling rate of the beams in the precoding matrix, and a constitution mode of the beam groups for each antenna group in $W_1$. A set of the first precoding matrices $W_1$ form a first codebook, a set of the second precoding matrices $W_2$ form a second codebook, and a set of the precoding matrices for data transmission acquired after the calculation form the codebook.

According to the embodiments of the present disclosure, the antenna array is divided into a plurality of antenna groups. Through two levels of codebooks, it is able to achieve the beam selection in each antenna group and the phase adjustment among the antenna groups. The two levels of codebooks are capable of being fed back respectively. As a result, it is able to quantize the channel in a more accurate manner, and improve the system performance. In addition, the quantity of the antenna groups may vary along with the quantity of data streams.

BRIEF DESCRIPTION OF THE DRAWINGS

FIG. 4A is a schematic view showing antenna groups of a single-polarized antenna array according to the first embodiment of the present disclosure;

FIG. 4B is a schematic view showing antenna groups of a dual-polarized antenna array according to the first embodiment of the present disclosure;

FIG. 5 is a flow chart of a CSI feedback method according to a second embodiment of the present disclosure;

DETAILED DESCRIPTION OF THE EMBODIMENTS

In the embodiments of the present disclosure, a UE may be a mobile phone or any other device capable of transmitting or receiving a radio signal, including a terminal, a Personal Digital Assistant (PDA), a wireless modem, a wireless communication device, a handheld device, a laptop computer, a cordless telephone, a Wireless Local Loop (WLL) station, Customer Premise Equipment (CPE) or a mobile intelligent hot spot capable of converting a mobile signal into a Wireless Fidelity (WiFi) signal, intelligent household electrical appliance, or any other device capable of spontaneously communicating with a mobile communication network. An access device may be a base station. It should be appreciated that, the form of the base station will not be particularly defined herein, and it may be a macro base station, a pico base station, NodeB (a $3^{rd}$-Generation (3G) mobile station), an evolved NodeB (eNB), a femto eNB (or Home eNB (HeNB)), a relay, an access point, a Remote Radio Unit (RRU), or a Remote Radio Head (RRH).

First Embodiment

Figure 1:
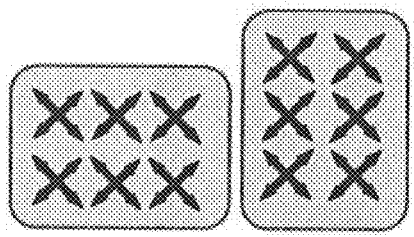
FIG. 1 is a schematic view showing 12 antenna ports for a two-dimensional antenna array in an LTE Rel-13 system.
Figure 2:
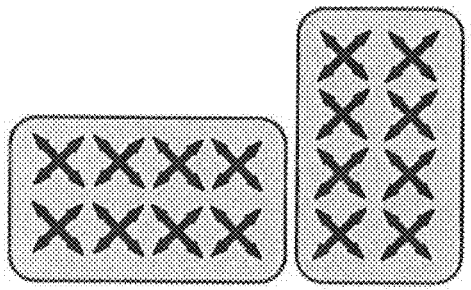
FIG. 2 is a schematic view showing 16 antenna ports for the two-dimensional antenna array in the LTE Rel-13 system.
Figure 3:
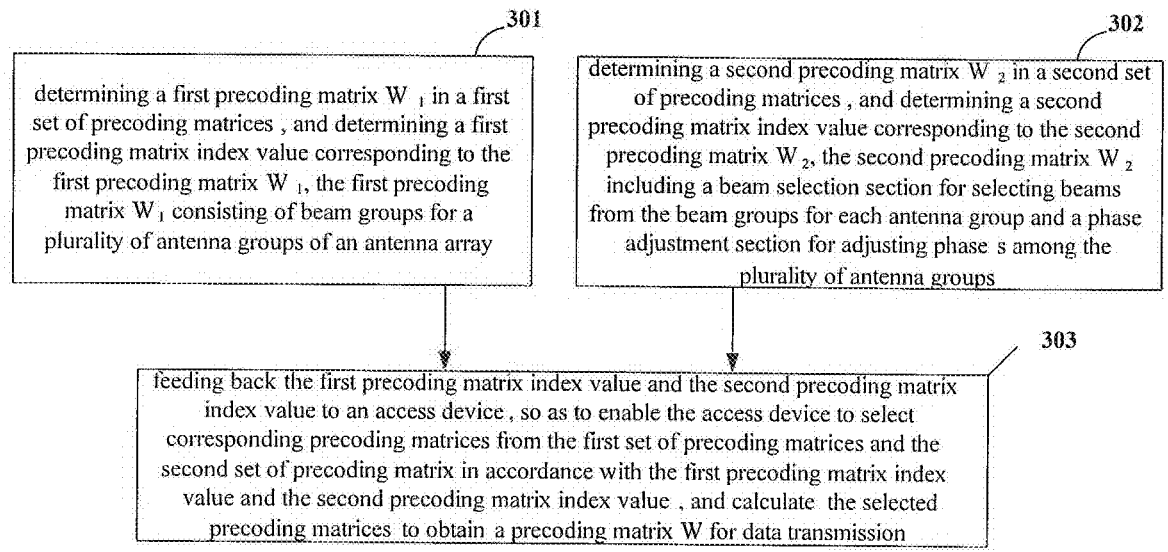
FIG. 3 is a flow chart of a CSI feedback method according to a first embodiment of the present disclosure.

The present disclosure provides in this embodiment a CSI feedback method implemented by a UE. As shown in FIG. 3, the CSI feedback method includes the following steps.

Step S301: determining a first precoding matrix $W_1$ in a set of first precoding matrices, and determining a first precoding matrix index value $(i_{1,1}, i_{1,2})$ corresponding to the first precoding matrix $W_1$. The first precoding matrix $W_1$ consists of beam groups for a plurality of antenna groups of an antenna array.

Step 302: determining a second precoding matrix $W_2$ in a set of second precoding matrices, and determining a second precoding matrix index value $(i_2)$ corresponding to the second precoding matrix $W_2$. The second precoding matrix $W_2$ includes a beam selection section for selecting beams from the beam groups for each antenna group and a phase adjustment section for adjusting phases among the plurality of antenna groups.

In a possible embodiment of the present disclosure, different granularities of feedback frequency domains and feedback periods may be adopted by the first precoding matrix $W_1$ and the second precoding matrix $W_2$. For example, the first precoding matrix $W_1$ is for describing a long-term characteristic of a channel, so it may be fed back using a wide band in a long-time manner. The second precoding matrix $W_2$ is for describing a short-term characteristic of the channel, so it may be fed back using a subband in a short-term manner.

Step S303: feeding back the first precoding matrix index value $(i_{1,1}, i_{1,2})$ and the second precoding matrix index value $(i_2)$ to an access device, so that the access device selects corresponding precoding matrices from the set of first precoding matrices and the set of second precoding matrix in accordance with the first precoding matrix index value $(i_{1,1}, i_{1,2})$ and the second precoding matrix index value $(i_2)$, and implements calculation on the selected precoding matrices to obtain a precoding matrix W for data transmission.

It should be appreciated that, a set of the precoding matrices in the above form is called as a codebook. In a possible embodiment of the present disclosure, the CSI feedback method further includes a step of configuring codebook parameters of the codebook. To be specific, this step includes: acquiring a channel measurement result, determining the codebook parameters of the codebook in accordance with the channel measurement result, and transmitting the codebook parameters to the access device; or acquiring the channel measurement result, determining the codebook parameters of the codebook in accordance with the channel measurement result, determining one or more parameters corresponding to the codebook parameters in accordance with a predetermined mapping relationship between the codebook parameters and the one or more parameters, and transmitting the one or more parameters to the access device.

The codebook parameters include one or more of the quantities: quantity M of the antenna groups, a grouping mode of the antenna groups, the quantity $N_i$ of antenna elements in each antenna group, the quantity of rows and columns of the antenna elements in each antenna group, a sampling rate of the beams in a precoding matrix, and a constitution mode of the beam groups (a beam group configuration mode) for each antenna group in $W_1$. The mapping relationship may be a mapping relation between the codebook parameters and the quantity of antenna ports, or between the codebook parameters and the quantity of the antenna ports as well as the quantity of data streams.

The present disclosure will be described hereinafter in conjunction with specific scenarios.

The antenna elements of the antenna array may be grouped. FIG. 4A shows the antenna groups of a single-polarized antenna array, where the antenna elements within each dotted box form a group. FIG. 4B shows the antenna groups of a dual-polarized antenna array, where the antenna elements within each dotted box form two groups and the antenna elements in each polarization direction form one group. The quantity of the antenna groups of the antenna array may be represented by M.

The precoding matrix W adopted by the access device has the following form:

$$W = W_1 W_2 = \begin{bmatrix} X_0 & & & & 0 \\ & X_1 & & & \\ & & X_2 & & \\ & & & \ddots & \\ 0 & & & & X_{M-1} \end{bmatrix} \cdot W_2.$$

The first precoding matrix $W_1$ is a block diagonal matrix including elements of 0 other than diagonal blocks where a beam group matrix $X_i$ is located, i=0, 1, ..., M−1, M represents the quantity of the antenna groups for the antenna array, $X_i$ represents a beam group for an $i^{th}$ antenna group and it is a $N_i \times L_i$ matrix, $N_i$ represents the quantity of antenna elements in the $i^{th}$ antenna group, N represents a total quantity of antenna elements for the antenna array and $$N = \sum_{i=0}^{M-1} N_i,$$

and $L_i$ represents the quantity of beams in the beam group for the $i^{th}$ antenna group. In a possible embodiment of the present disclosure, the beam group matrix $X_i$ may consist of a group of Discrete Fourier Transform (DFT) vectors, and each DFT vector represents a beam direction.

The second precoding matrix $W_2$ is configured for beam selection and phase adjustment, and it is capable of selecting several beams from each beam group and adjusting phases of the selected beams for respective antenna groups, so as to acquire a final precoding matrix.

In a possible embodiment of the present disclosure, $$W_2' = \begin{bmatrix} E_0 & & & & 0 \\ & E_1 & & & \\ & & E_2 & & \\ & & & \ddots & \\ 0 & & & & E_{M-1} \end{bmatrix} \cdot W_p, \text{ where}$$

$$\begin{bmatrix} E_0 & & & & 0 \\ & E_1 & & & \\ & & E_2 & & \\ & & & \ddots & \\ 0 & & & & E_{M-1} \end{bmatrix}$$

represents the beam selection section and configured to select $r_1$ beams from each antenna group, a beam selection vector for the $i^{th}$ antenna group is defined as $E_i = \lfloor e_{i,0} \, e_{i,1} \, \ldots \, e_{i,r_1-1} \rfloor$, where $e_{i,j}$ represents a column selection vector having a length of $L_i$ and it is configured to select one beam from the beam group matrix $X_i$ or merge the beams in $X_i$ into one beam, $j=0, 1, \ldots r_1-1$, $W_p$ represents the phase adjustment section, and r columns of $W_2'$ are selected as the second precoding matrix $W_2$.

In a possible embodiment of the present disclosure, merely one element in $e_{i,j}$ is 1, and the other elements are 0.

a) When the $r_1$ beams are orthogonal to each other, the phase adjustment among the antenna groups may be defined as $U = \lfloor u_0 \, u_1 \, \ldots \, u_{r_2-1} \rfloor$, where $r_2$ is a minimum integer greater than or equal to $$\frac{r}{r_1},$$

$u_i$ represents a phase adjustment factor among the antenna groups for adjusting a phase relationship among the antenna groups and it is a column vector having a length of M, and column vectors in U are orthogonal to each other so as to ensure that there is no interference among the data streams. In a possible embodiment of the present disclosure, U is generated through Householder transform. Hence, $W_2'$ may be expressed as:

$$W_2' = \begin{bmatrix} E_0 & & & & 0 \\ & E_1 & & & \\ & & E_2 & & \\ & & & \ddots & \\ 0 & & & & E_{M-1} \end{bmatrix} \cdot (U \otimes I_{r_1}),$$

where $I_{r_1}$ is a $r_1 \times r_1$ unit matrix. r columns, e.g., previous r columns, may be selected from $W_2'$ as $W_2$. It should be appreciated that, when calculating the final precoding matrix, a result of $W_1 \cdot W_2$ may be normalized.

When $r_1=1$, $$W_2' = \begin{bmatrix} E_0 & & & & 0 \\ & E_1 & & & \\ & & E_2 & & \\ & & & \ddots & \\ 0 & & & & E_{M-1} \end{bmatrix} \cdot U.$$

Further, when $E_0 = E_1 = \ldots = E_{M-1}$, $W_2 = U \otimes E_0$.

b) When the $r_1$ beams are not orthogonal to each other, a same beam or different beams may be selected.

To be specific, when the $r_1$ beams are not orthogonal to each other, these $r_1$ beams may be the same or different from each other, on the premise that M is capable of being divided exactly by $r_1$. At this time, every $r_1$ antenna groups of the M antenna groups may form a large group, i.e., a superior group, so there are totally $$\frac{M}{r_1}$$

superior groups. In a possible embodiment of the present disclosure, the same $r_1$ beams may be selected for the antenna groups in each superior group. $W_p = U \otimes V$, where U is an orthogonal matrix for the phase adjustment among the superior groups and includes $r_2$ columns each including $$\frac{M}{r_1}$$

phase adjustment factors, $r_2$ is a minimum integer greater than or equal to $$\frac{r}{r_1},$$

V is configured for the phase adjustment among the antenna groups in one superior group and $V = [V'(:,1) \otimes e_{r_1}^{(1)} \, V'(:,2) \otimes e_{r_1}^{(2)} \, \ldots \, V'(:,r_1) \otimes e_{r_1}^{(r_1)}]$, V' is an orthogonal matrix and includes $r_1$ columns each including $r_1$ phase adjustment factors, $V'(:,i)$ represents an $i^{th}$ column of V', and $e_{r_1}^{(i)}$ represents an $i^{th}$ column of a unit matrix $I_{r_1 \times r_1}$.

Based on the above, the rank r of the precoding matrix consists of two parts, i.e., the quantity $r_1$ of the beams selected for each antenna group, and the quantity $r_2$ of the data streams among the antenna groups.

When $r_1=1$ and $r_2=r$, merely one beam may be selected for each antenna group, r data streams may be transmitted parallel to each other among the antenna groups through the phase adjustment. Usually, the distance between antennas in the antenna group is relatively small and the correlation of the antenna array is relatively strong, so low-rank transmission may be performed appropriately. The distance between the antenna groups is relatively large and the correlation of the antenna array is relatively weak, so high-rank transmission may be performed appropriately. This configuration is relatively typical.

When $r_1=r$ and $r_2=1$, r beams may be selected from each antenna group for the parallel transmission of r data streams, and the phase adjustment among the antenna groups may be merely performed with respect to these data streams.

When $r_1=2$ and $$r_2 = \left\lfloor \frac{r+1}{2} \right\rfloor,$$

two data streams may be transmitted parallel to each other in each antenna group, and $$\frac{r}{r_1}$$

or more data streams may be transmitted through the phase adjustment among the antenna groups. For the other combination modes of $r_1$ and $r_2$, the beam selection and the phase adjustment may be performed in a similar way.

In a possible embodiment of the present disclosure, the quantity M of the antenna groups of the antenna array may vary along with the quantity of the data streams (i.e., the rank r of the precoding matrix). For example, a relationship between the quantity M of the antenna groups and the quantity of the data streams needs to meet a condition M≥$r_2$, where $r_2$ is a minimum integer greater than or equal to $$\frac{r}{r_i}.$$

In a possible embodiment of the present disclosure, the first precoding matrix $W_1$ is configured for describing a long-term characteristic of a channel, so it may be fed back using a wide band in a long-time manner. The second precoding matrix $W_2$ is for describing a short-term characteristic of the channel, so it may be fed back using a subband in a short-term manner.

In a possible embodiment of the present disclosure, a set of the first precoding matrices $W_1$ and a set of the second precoding matrices $W_2$ may be are constructed respectively, and then the code book may be calculated in accordance with the matrices in the two sets. The set of the first precoding matrices $W_1$ may be called as a first-level codebook, and the set of the second precoding matrices $W_2$ may be called as a second-level codebook.

Example 1

For the dual-polarized antenna array, typically $r_1$=1, and the antenna groups each include a same quantity of antenna elements, i.e., $N_0$=$N_1$= . . . =$N_{M-1}$.

In a possible embodiment of the present disclosure, the relationship between the quantity of the antenna groups of the antenna array and the rank r of the precoding matrix may meet a condition $$M = 2 \cdot \left\lfloor \frac{r+1}{2} \right\rfloor,$$

where r represents the rank of the precoding matrix, M represents the quantity of the antenna groups of the antenna array, and ⌊•⌋ represents a round-down operation.

In another possible embodiment of the present disclosure, the relationship between the quantity of the antenna groups of the antenna array and the rank r of the precoding matrix is shown in Table 1.

TABLE 1 relationship between the quantity of antenna groups of antenna array and rank of precoding matrix

| Rank $r$ of precoding matrix | The quantity $M$ of the antenna groups of antenna array |
|---|---|
| 1 | 2 |
| 2 | 2 |
| 3 | 4 |
| 4 | 4 |
| 5 | 8 |
| 6 | 8 |
| 7 | 8 |
| 8 | 8 |

In a possible embodiment of the present disclosure, the beams for each antenna groups may be selected from a same set of beam vectors, and the quantity $L_i$ of the beams included in the beam group matrices $X_i$ may be the same.

$W_i$ may be constructed using the DFT vectors as follows.

i) When each antenna group is a two-dimensional antenna array, two groups of DFT vectors in two dimension may be defined as follows:

$$h_l = \begin{bmatrix} 1 & e^{\frac{j2\pi l}{N_h O_1}} & \cdots & e^{\frac{j2\pi(N_h-1)l}{N_h O_1}} \end{bmatrix}^T, l = 0, 1, \cdots, N_h O_1 - 1, \text{ and}$$

$$v_k = \begin{bmatrix} 1 & e^{\frac{j2\pi k}{N_v O_2}} & \cdots & e^{\frac{j2\pi(N_v-1)k}{N_v O_2}} \end{bmatrix}^T, k = 0, 1, \cdots, N_v O_2 - 1,$$

where $N_h$ represents the quantity of the antennas in each antenna group in a first dimension, $N_v$ represents the quantity of antennas in each antenna group in a second dimension, $N_i$=$N_h \cdot N_v$, and $O_1$ and $O_2$ represent an oversampling factor in the first dimension and an oversampling factor in the second direction respectively. A Kronecker product of the two DFT vectors in the two dimensions may form a beam direction, so a set of $N_h O_1 \cdot N_v O_2$ beam vectors may be provided as follows: $\{y_{1,k}=v_k \otimes h_l, l=0, 1, \ldots, N_h O_1-1, k=0, 1, \ldots, N_v O_2-1\}$.

Every $L_i$ vectors in the set of beam vectors may form one group. In a possible grouping mode, $L_i$=4, and each beam group may be defined using a two-dimensional index ($i_{1,1}$, $i_{1,2}$), i.e., $X^{(i_{1,1},i_{1,2})}=[v_{mod(2i_{1,2},N_vO_2)} \otimes h_{mod(2i_{1,1},N_hO_1)}, v_{mod(2i_{1,2}+1,N_vO_2)} \otimes h_{mod(2i_{1,1},N_hO_1)}, v_{mod(2i_{1,2},N_vO_2)} \otimes h_{mod(2i_{1,1}+1,N_hO_1)}, v_{mod(2i_{1,2}+1,N_vO_2)} \otimes h_{mod(2i_{1,1}+1,N_hO_1)}]$, where $i_{1,1}$=0, 1, . . . , $N_hO_1/2-1$, and $i_{1,2}$=0, 1, . . . , $N_vO_2/2-1$. The entire set of beam vectors may include ($N_hO_1/2$)·($N_vO_2/2$) beam groups. Hence, with respect to the beam group $X_i$ for each antenna group, $X_i \in \{X^{(i_{1,1},i_{1,2})}, i_{1,1}$=0, 1, . . . , $N_hO_1/2-1$, $i_{1,2}$=0, 1, . . . , $N_vO_2/2-1\}$.

When all the antenna groups have the same beam groups, i.e., $X_0=X_1=X_{M-1}$, the first-level codebook may include ($N_hO_1/2$)·($N_vO_2/2$) $W_1$ codewords. During the feedback of the CSI, the UE may feed back the beam group index ($i_{1,1},i_{1,2}$) as a codeword index to the access device. Otherwise, the first-level codebook may include (($N_hO_1/2$)·($N_vO_2/2$))$^M$ $W_1$ codewords. During the feedback of the CSI, the UE may feed back the beam group index ($i_{1,1},i_{1,2}$) for each antenna group to the access device, or feed back indices of combinations of the M beam group indices in the (($N_hO_1/2$)·($N_vO_2/2$))$^M$ codewords to the access device.

ii) When each antenna group is a one-dimension antenna array, a group of DFT vectors may be defined as follows:

$$v_l = \begin{bmatrix} 1 & e^{\frac{j2\pi l}{N_i O}} & \cdots & e^{\frac{j2\pi(N_i-1)l}{N_i O}} \end{bmatrix}^T, l = 0, 1, \cdots, N_i O - 1,$$

where $N_i$ represents the quantity of the antennas in each antenna group, and O represents an oversampling factor.

Hence, a set of $N_iO$ beam vectors may be provided. Every $L_i$ vectors in the set of beam vectors may form one group. In a possible grouping mode, $L_i=4$, and each beam group may be defined using a one-dimension index $i_1$, i.e., $X_i \in \{X^{(i_{1,1},i_{1,2})}, i_{1,1}=0, 1, \ldots, N_hO_1/2-1, i_{1,2}=0, 1, \ldots, N_vO_2/2-1\}$. The entire set of beam vectors may include $N_iO/2$ beam groups. Hence, with respect to the beam group $X_i$ for each antenna group, $X_i \in \{X^{(i_1)}, i_1=0, 1, \ldots, N_iO/2-1\}$.

When all the antenna groups have the same beam groups, i.e., $X_0=X_1=\ldots=X_{M-1}$, the first-level codebook may include $N_iO/2$ $W_1$ codewords. During the feedback of the CSI, the UE may feed back the beam group index $i_1$ as a codeword index to the access device. Otherwise, the first-level codebook may include $(N_iO/2)^M$ $W_1$ codewords. During the feedback of the CSI, the UE may feed back the beam group index $i_1$ for each antenna group to the access device, or feed back indices of combinations of the M beam group indices in the $(N_iO/2)^M$ codewords to the access device.

$W_2$ may be constructed as follows. Because $r_1=1$, $$W_2 = \begin{bmatrix} e_{0,0} & & & 0 \\ & e_{1,0} & & \\ & & e_{2,0} & \\ & & & \ddots \\ 0 & & & e_{M-1,0} \end{bmatrix} \cdot U,$$

where $e_{i,0}$ is a column selection vector having a length of 4 (because $L_i=4$). When $e_{i,0}$ is a unit vector, it may include one element of 1 (indicating that the beams corresponding to this column may be selected) and the other elements of 0. For one antenna group, there are four possible column selection sections, i.e., $e_{i,0} \in \{[1\ 0\ 0\ 0]^T, [0\ 1\ 0\ 0]^T, [0\ 0\ 1\ 0]^T, [0\ 0\ 0\ 1]^T\}$. Hence, there exist $4^M$ possible combinations for the column selection sections of $W_2$. For example, $e_{0,0}=e_{1,0}=e_{2,0}=\ldots=e_{M-1,0}$, and at this time, $W_2=U \otimes e_{0,0}$.

The phase adjustment matrix U among the antenna groups is an M×r matrix, and it may be expressed as:

$$U = [u_0\ u_1\ \cdots\ u_{r-1}] = \begin{bmatrix} u_{0,0} & u_{0,1} & \cdots & u_{0,r-1} \\ u_{1,0} & u_{1,1} & \cdots & u_{1,r-1} \\ \vdots & \vdots & \vdots & \vdots \\ u_{M-1,0} & u_{M-1,1} & \cdots & u_{M-1,r-1} \end{bmatrix}.$$

Assume there are Q phase adjustment matrices, i.e., $U_0$, $U_1$, \ldots, $U_{Q-1}$. As mentioned above, the elements in each column of the matrix U are configured for adjusting the phase among the antenna groups, and all the columns of the matrix U need to be orthogonal to each other, so as to prevent the interference among the data streams. In a possible embodiment of the present disclosure, the following two construction modes may be provided so as to meet the above requirement.

Construction Mode 1 for the Phase Adjustment Matrix Among the Antenna Groups

As a typical method for constructing an orthogonal basis, Householder transform may be used to construct the matrix U. A Householder transform matrix may be defined as follows: $P_n = I - 2s_n s_n^H / s_n^H s_n$, wherein $s_n$ represents a base vector having a length of M and each element in $s_n$ consists of $\{\pm 1, \pm j\}$ and $\{(\pm 1 \pm j)/\sqrt{2}\}$, and I represents an M×M unit matrix. Here, Q base vectors may be generated, i.e., $n=0, 1, \ldots, Q-1$. The transform matrix $P_n$ may be calculated for each base vector, a column order of the transform matrix $P_n$ may be adjusted, and then r columns may be selected from the transform matrix $P_n$, so as to acquire the phase adjustment matrix U. Hence, there are Q combinations for the phase adjustment sections of $W_2$. In this regard, the second-level codebook may include $4^M \cdot Q$ codewords, and $i_2$ ($i_2=0, 1, \ldots, 4^M \cdot Q-1$) may be adopted as a Precoding Matrix Indicator (PMI) to indicate and feed back the precoding matrix.

For the codebook where rank=3, $$M = 2 \cdot \left\lfloor \frac{r+1}{2} \right\rfloor,$$

so M=4. Presumed that the quantity Q of the base vectors for the Householder transform is Q=4, a set of the phase adjustment matrices U may be expressed as $$\left\{ \frac{1}{2}\begin{bmatrix} 1 & 1 & 1 \\ 1 & 1 & -1 \\ 1 & -1 & -1 \\ 1 & -1 & 1 \end{bmatrix}, \frac{1}{2}\begin{bmatrix} 1 & -j & -1 \\ j & 1 & j \\ -1 & -j & 1 \\ -j & 1 & -j \end{bmatrix}, \frac{1}{2}\begin{bmatrix} 1 & -1 & 1 \\ -1 & 1 & 1 \\ 1 & 1 & 1 \\ -1 & -1 & 1 \end{bmatrix}, \frac{1}{2}\begin{bmatrix} 1 & j & -1 \\ -j & 1 & -j \\ -1 & j & 1 \\ j & 1 & j \end{bmatrix} \right\}.$$

Construction Mode 2 for the Phase Adjustment Matrix Among the Antenna Groups

The phase adjustment matrix among the antenna groups may be constructed using a Grassmannian manifold. A set of the matrices $U_0$, $U_1$, $U_2$, \ldots, $U_{Q-1}$ may be acquired by solving the following optimization problem $$\{U_0,\ U_1,\ U_2,\ \cdots,\ U_{Q-1}\} = \arg\max_{\{F_0,F_1,\cdots,F_{Q-1}|F_q^H F_q = I_{r \times r}, q=0,1,\cdots,Q-1\}} \min_{0 \le i \le j \le Q-1} dist(F_i, F_j),$$

represents a r'×r unit matrix, and dist (A, B) represents a distance between two matrices A and B, e.g., $dist(A,B)=\|A-B\|_F$ (Frobenius norm) or $dist(A,B)=\|A-B\|_2$.

A minimum distance among the Q matrices in the acquired set of matrices may be of a maximum value or an approximately maximum value in all possible sets of matrices. It should be appreciated that, the above optimization problem may be solved through an offline computer calculation method.

Upon the acquisition of the first-level codebook and the second-level codebook as mentioned above, one matrix in the first-level codebook may be multiplied by one matrix in the second-level codebook, and then a resultant matrix may be normalized, so as to acquire the precoding matrix in the codebook. When each antenna group is a two-dimensional antenna array, the normalization operation may be performed as follows:

$$W = \frac{1}{\sqrt{N_h N_v \cdot r}} \begin{bmatrix} X_0 & & & 0 \\ & X_1 & & \\ & & X_2 & \\ & & & \ddots \\ 0 & & & X_{M-1} \end{bmatrix}.$$

-continued $$\begin{bmatrix} u_{0,0}e_{0,0} & u_{0,1}e_{0,0} & \cdots & u_{0,r-1}e_{0,0} \\ u_{1,0}e_{1,0} & u_{1,1}e_{1,0} & \cdots & u_{1,r-1}e_{1,0} \\ u_{2,0}e_{2,0} & u_{2,1}e_{2,0} & \cdots & u_{2,r-1}e_{2,0} \\ \vdots & & \vdots & \\ u_{M-1,0}e_{M-1,0} & u_{M-1,1}e_{M-1,0} & \cdots & u_{M-1,r-1}e_{M-1,0} \end{bmatrix},$$

where $N_h$ represents the quantity of the antennas in the first dimension in the antenna group, $N_v$ represents the quantity of the antennas in the second dimension in the antenna group, and r represents the quantity of the data streams.

In a possible embodiment of the present disclosure, presumed that $e_{0,0}=e_{1,0}=\ldots=e_{M-1,0}$ and an $i^{th}$ vector in the column selection section is adopted, the precoding matrix W may be calculated using the following equation:

$$W = \frac{1}{\sqrt{N_h N_v \cdot r}} \begin{bmatrix} u_{0,0}X_0(:,i) & u_{0,1}X_0(:,i) & \cdots & u_{0,r-1}X_0(:,i) \\ u_{1,0}X_1(:,i) & u_{1,1}X_1(:,i) & \cdots & u_{1,r-1}X_1(:,i) \\ u_{2,0}X_2(:,i) & u_{2,1}X_2(:,i) & \cdots & u_{2,r-1}X_2(:,i) \\ \vdots & & \vdots & \\ u_{M-1,0}X_{M-1}(:,i) & u_{M-1,1}X_{M-1}(:,i) & \cdots & u_{M-1,r-1}X_{M-1}(:,i) \end{bmatrix},$$

where $X_i(:,i)$ represents the $i^{th}$ column of the matrix to be selected.

When the quantity M of the antenna groups is M=4, the quantity r of the data streams is r=3, $X_0=X_1=\ldots=X_{M-1}$ and $e_{0,0}=e_{1,0}=\ldots=e_{M-1,0}$, the codebook may be shown in Table 2.

TABLE 2 codebook where the quantity M of the antenna groups is M = 4 and the quantity r of the data streams is r = 3

| $i_{1,1}, i_{1,2}$ | $i_2$ | | | |
|---|---|---|---|---|
| | 0 | 1 | 2 | 3 |
| $i_{1,1} = 0, 1, \ldots, N_h O_1/2 - 1$ $i_{1,2} = 0, 1, \ldots, N_v O_2/2 - 1$ | $W_{(2i_{1,1}, 2i_{1,2})}^{(3)}$ | $W_{(2i_{1,1}, 2i_{1,2}+1)}^{(3)}$ | $W_{(2i_{1,1}+1, 2i_{1,2})}^{(3)}$ | $W_{(2i_{1,1}+1, 2i_{1,2}+1)}^{(3)}$ |

| $i_{1,1}, i_{1,2}$ | $i_2$ | | | |
|---|---|---|---|---|
| | 4 | 5 | 6 | 7 |
| $i_{1,1} = 0, 1, \ldots, N_h O_1/2 - 1$ $i_{1,2} = 0, 1, \ldots, N_v O_2/2 - 1$ | $\tilde{w}_{(2i_{1,1}, 2i_{1,2})}^{(3)}$ | $\tilde{w}_{(2i_{1,1}, 2i_{1,2}+1)}^{(3)}$ | $\tilde{w}_{(2i_{1,1}+1, 2i_{1,2})}^{(3)}$ | $w_{(2i_{1,1}+1, 2i_{1,2}+1)}^{(3)}$ |

| $i_{1,1}, i_{1,2}$ | $i_2$ | | | |
|---|---|---|---|---|
| | 8 | 9 | 10 | 11 |
| $i_{1,1} = 0, 1, \ldots, N_h O_1/2 - 1$ $i_{1,2} = 0, 1, \ldots, N_v O_2/2 - 1$ | $\overline{w}_{(2i_{1,1}, 2i_{1,2})}^{(3)}$ | $\overline{w}_{(2i_{1,1}, 2i_{1,2}+1)}^{(3)}$ | $w_{(2i_{1,1}+1, 2i_{1,2})}^{(3)}$ | $\overline{w}_{(2i_{1,1}+1, 2i_{1,2}+1)}^{(3)}$ |

| $i_{1,1}, i_{1,2}$ | $i_2$ | | | |
|---|---|---|---|---|
| | 12 | 13 | 14 | 15 |
| $i_{1,1} = 0, 1, \ldots, N_h O_1/2 - 1$ $i_{1,2} = 0, 1, \ldots, N_v O_2/2 - 1$ | $\hat{w}_{(2i_{1,1}, 2i_{1,2})}^{(3)}$ | $\hat{w}_{(2i_{1,1}, 2i_{1,2}+1)}^{(3)}$ | $\hat{w}_{(2i_{1,1}+1, 2i_{1,2})}^{(3)}$ | $\hat{w}_{(2i_{1,1}+1, 2i_{1,2}+1)}^{(3)}$ | where $$w_{(m_1, m_2)}^{(3)} = \frac{1}{\sqrt{4 N_h N_v \cdot r}} \cdot \begin{bmatrix} v_{mod(m_2, N_v O_2)} \otimes & v_{mod(m_2, N_v O_2)} \otimes & v_{mod(m_2, N_v O_2)} \otimes \\ h_{mod(m_1, N_h O_1)} & h_{mod(m_1, N_h O_1)} & h_{mod(m_1, N_h O_1)} \\ v_{mod(m_2, N_v O_2)} \otimes & v_{mod(m_2, N_v O_2)} \otimes & -1 \cdot v_{mod(m_2, N_v O_2)} \otimes \\ h_{mod(m_1, N_h O_1)} & h_{mod(m_1, N_h O_1)} & h_{mod(m_1, N_h O_1)} \\ v_{mod(m_2, N_v O_2)} \otimes & -1 \cdot v_{mod(m_2, N_v O_2)} \otimes & -1 \cdot v_{mod(m_2, N_v O_2)} \otimes \\ h_{mod(m_1, N_h O_1)} & h_{mod(m_1, N_h O_1)} & h_{mod(m_1, N_h O_1)} \\ v_{mod(m_2, N_v O_2)} \otimes & -1 \cdot v_{mod(m_2, N_v O_2)} \otimes & v_{mod(m_2, N_v O_2)} \otimes \\ h_{mod(m_1, N_h O_1)} & h_{mod(m_1, N_h O_1)} & h_{mod(m_1, N_h O_1)} \end{bmatrix},$$

TABLE 2-continued codebook where the quantity M of the antenna groups is M = 4 and the quantity r of the data streams is r = 3

$$\tilde{W}^{(3)}_{(m_1,m_2)} = \frac{1}{\sqrt{4N_hN_v \cdot r}} \cdot$$

$$\begin{bmatrix} v_{mod(m_2,N_vO_2)} \otimes & -j \cdot v_{mod(m_2,N_vO_2)} \otimes & -1 \cdot v_{mod(m_2,N_vO_2)} \otimes \\ h_{mod(m_1,N_hO_1)} & h_{mod(m_1,N_hO_1)} & h_{mod(m_1,N_hO_1)} \\ j \cdot v_{mod(m_2,N_vO_2)} \otimes & v_{mod(m_2,N_vO_2)} \otimes & j \cdot v_{mod(m_2,N_vO_2)} \otimes \\ h_{mod(m_1,N_hO_1)} & h_{mod(m_1,N_hO_1)} & h_{mod(m_1,N_hO_1)} \\ -1 \cdot v_{mod(m_2,N_vO_2)} \otimes & -j \cdot v_{mod(m_2,N_vO_2)} \otimes & 1 \cdot v_{mod(m_2,N_vO_2)} \otimes \\ h_{mod(m_1,N_hO_1)} & h_{mod(m_1,N_hO_1)} & h_{mod(m_1,N_hO_1)} \\ -j \cdot v_{mod(m_2,N_vO_2)} \otimes & v_{mod(m_2,N_vO_2)} \otimes & -j \cdot v_{mod(m_2,N_vO_2)} \otimes \\ h_{mod(m_1,N_hO_1)} & h_{mod(m_1,N_hO_1)} & h_{mod(m_1,N_hO_1)} \end{bmatrix}$$

$$\overline{W}^{(3)}_{(m_1,m_2)} = \frac{1}{\sqrt{4N_hN_v \cdot r}} \cdot$$

$$\begin{bmatrix} v_{mod(m_2,N_vO_2)} \otimes & -1 \cdot v_{mod(m_2,N_vO_2)} \otimes & v_{mod(m_2,N_vO_2)} \otimes \\ h_{mod(m_1,N_hO_1)} & h_{mod(m_1,N_hO_1)} & h_{mod(m_1,N_hO_1)} \\ -1 \cdot v_{mod(m_2,N_vO_2)} \otimes & v_{mod(m_2,N_vO_2)} \otimes & v_{mod(m_2,N_vO_2)} \otimes \\ h_{mod(m_1,N_hO_1)} & h_{mod(m_1,N_hO_1)} & h_{mod(m_1,N_hO_1)} \\ v_{mod(m_2,N_vO_2)} \otimes & v_{mod(m_2,N_vO_2)} \otimes & v_{mod(m_2,N_vO_2)} \otimes \\ h_{mod(m_1,N_hO_1)} & h_{mod(m_1,N_hO_1)} & h_{mod(m_1,N_hO_1)} \\ -1 \cdot v_{mod(m_2,N_vO_2)} \otimes & -1 \cdot v_{mod(m_2,N_vO_2)} \otimes & v_{mod(m_2,N_vO_2)} \otimes \\ h_{mod(m_1,N_hO_1)} & h_{mod(m_1,N_hO_1)} & h_{mod(m_1,N_hO_1)} \end{bmatrix}$$

$$\hat{W}^{(3)}_{(m_1,m_2)} = \frac{1}{\sqrt{4N_hN_v \cdot r}} \cdot$$

$$\begin{bmatrix} v_{mod(m_2,N_vO_2)} \otimes & j \cdot v_{mod(m_2,N_vO_2)} \otimes & -1 \cdot v_{mod(m_2,N_vO_2)} \otimes \\ h_{mod(m_1,N_hO_1)} & h_{mod(m_1,N_hO_1)} & h_{mod(m_1,N_hO_1)} \\ -j \cdot v_{mod(m_2,N_vO_2)} \otimes & v_{mod(m_2,N_vO_2)} \otimes & -j \cdot v_{mod(m_2,N_vO_2)} \otimes \\ h_{mod(m_1,N_hO_1)} & h_{mod(m_1,N_hO_1)} & h_{mod(m_1,N_hO_1)} \\ -1 \cdot v_{mod(m_2,N_vO_2)} \otimes & j \cdot v_{mod(m_2,N_vO_2)} \otimes & v_{mod(m_2,N_vO_2)} \otimes \\ h_{mod(m_1,N_hO_1)} & h_{mod(m_1,N_hO_1)} & h_{mod(m_1,N_hO_1)} \\ j \cdot v_{mod(m_2,N_vO_2)} \otimes & v_{mod(m_2,N_vO_2)} \otimes & j \cdot v_{mod(m_2,N_vO_2)} \otimes \\ h_{mod(m_1,N_hO_1)} & h_{mod(m_1,N_hO_1)} & h_{mod(m_1,N_hO_1)} \end{bmatrix}$$

TABLE 2-A codebook where the quantity M of the antenna groups is M = 4 and the quantity r of the data streams is r = 4

| | $i_2$ | | | | | | | |
|---|---|---|---|---|---|---|---|---|
| $i_{1,1}, i_{1,2}$ | 0 | 1 | 2 | 3 | 4 | 5 | 6 | 7 |
| $i_{1,1} = 0, 1, \ldots, N_hO_1/2 - 1$ $i_{1,2} = 0, 1, \ldots, N_vO_2/2 - 1$ | $W^{(4)}_{(2i_{1,1},2i_{1,2},0)}$ | $W^{(4)}_{(2i_{1,1},2i_{1,2}+1,0)}$ | $W^{(4)}_{(2i_{1,1}+1,2i_{1,2},0)}$ | $W^{(4)}_{(2i_{1,1},2i_{1,2}+1,0)}$ | $W^{(4)}_{(2i_{1,1},2i_{1,2},1)}$ | $W^{(4)}_{(2i_{1,1},2i_{1,2}+1,1)}$ | $W^{(4)}_{(2i_{1,1}+1,2i_{1,2},1)}$ | $W^{(4)}_{(2i_{1,1}+1,2i_{1,2}+1,1)}$ |

| | $i_2$ | | | | | | | |
|---|---|---|---|---|---|---|---|---|
| $i_{1,1}, i_{1,2}$ | 8 | 9 | 10 | 11 | 12 | 13 | 14 | 15 |
| $i_{1,1} = 0, 1, \ldots, N_hO_1/2 - 1$ $i_{1,2} = 0, 1, \ldots, N_vO_2/2 - 1$ | $W^{(4)}_{(2i_{1,1},2i_{1,2},2)}$ | $W^{(4)}_{(2i_{1,1},2i_{1,2}+1,2)}$ | $W^{(4)}_{(2i_{1,1}+1,2i_{1,2},2)}$ | $W^{(4)}_{(2i_{1,1}+1,2i_{1,2}+1,2)}$ | $W^{(4)}_{(2i_{1,1},2i_{1,2},3)}$ | $W^{(4)}_{(2i_{1,1},2i_{1,2}+1,3)}$ | $W^{(4)}_{(2i_{1,1}+1,2i_{1,2},3)}$ | $W^{(4)}_{(2i_{1,1}+1,2i_{1,2}+1,3)}$ | where

TABLE 2-A-continued codebook where the quantity M of the antenna groups is M = 4
and the quantity r of the data streams is r = 4

$$W^{(4)}_{(m_1,m_2,n)} = \frac{1}{\sqrt{4N_h N_v \cdot r}} \cdot Z_n \otimes (v_{mod(m_2,N_v O_2)} \otimes h_{mod(m_1,N_h O_1)}),$$

where $Z_n$ belongs to a set of matrices and each matrix in the set having a dimension of 4 × 4

---

Based on the above definition of the codebook, $(i_{1,1}, i_{1,2})$ is used by the first-level codebook as a first-level PMI1, and $i_2$ is used by the second-level codebook as a second-level PMI2. Different granularities of feedback frequency domains and feedback periods may be adopted by the PMI1 and the PMI2. In a possible embodiment of the present disclosure, the PMI1 is fed back in a long-time manner using a wide band, while the PMI2 is fed back in a short-term manner using a subband. The access device may determine the precoding matrix for the data transmission in accordance with the feedback of the two levels of codebooks.

Example 2

For the dual-polarized antenna array, $r_1=2$, and the antenna groups each include a same quantity of antenna elements, i.e., $N_0=N_1=\ldots=N_{M-1}$.

For example, the relationship between the quantity of the antenna groups of the antenna array and the rank r of the precoding matrix is shown in Table 3.

TABLE 3 relationship between the quantity of antenna groups
of antenna array and rank of precoding matrix

| Rank $r$ of precoding matrix | The quantity $M$ of the antenna groups of antenna array |
|---|---|
| 1 | 2 |
| 2 | 2 |
| 3 | 2 |
| 4 | 2 |
| 5 | 4 |
| 6 | 4 |
| 7 | 4 |
| 8 | 4 |

In a possible embodiment of the present disclosure, the beams for each antenna groups may be selected from a same set of beam vectors, and the quantity $L_i$ of the beams included in the beam group matrices $X_i$ may be the same.

$W_1$ may be constructed as follows.

$W_1$ may be constructed in a similar way as Example 1. As mentioned above, in a possible embodiment of the present disclosure, each beam group may include the beams orthogonal to each other, so the beam group matrix $X_i$ may be slightly different from that in Example 1. Every $L_i$ vectors in the set of beam vectors may form one group, and $L_i=8$. At this time, in a possible grouping mode, $$X^{(i_{1,1},i_{1,2})} = [v_{mod(2i_{1,2},N_v O_2)} \otimes h_{mod(2i_{1,1},N_h O_1)},$$

$$v_{mod(2i_{1,2}+1,N_v O_2)} \otimes h_{mod(2i_{1,1},N_h O_1)}, v_{mod(2i_{1,2},N_v O_2)} \otimes h_{mod(2i_{1,1}+1,N_h O_1)},$$

$$v_{mod(2i_{1,2}+1,N_v O_2)} \otimes h_{mod(2i_{1,1}+1,N_h O_1)} v_{mod(2i_{1,2},N_v O_2)} \otimes h_{mod(2i_{1,1}+O_1,N_h O_1)},$$

-continued $$v_{mod(2i_{1,2}+1,N_v O_2)} \otimes h_{mod(2i_{1,1}+O_1,N_h O_1)},$$

$$v_{mod(2i_{1,2},N_v O_2)} \otimes h_{mod(2i_{1,1}+1+O_1,N_h O_1)},$$

$$v_{mod(2i_{1,2}+1,N_v O_2)} \otimes h_{mod(2i_{1,1}+1+O_1,N_h O_1)}],$$

where $i_{1,1}=0, 1, \ldots, N_h O_1/2-1$, and $i_{1,2}=0, 1, \ldots, N_v O_2/2-1$. In this grouping mode, beams 1, 2, 3, 4 are orthogonal to beams 5, 6, 7 and 8 respectively. The entire set of beam vectors may include $(N_h O_1/2) \cdot (N_v O_2/2)$ beam groups. Hence, with respect to the beam group $X_i$ for each antenna group, $X_i \in \{X^{(i_{1,1},i_{1,2})}, i_{1,1}=0, 1, \ldots, N_h O_1/2-1, i_{1,2}=0, 1, \ldots, N_v O_2/2-1\}$. The other procedures are the same as those mentioned in Example 1, and thus will not be particularly defined herein.

$W_2$ may be constructed as follows. Because $r_1=2$, $$W_2' = \begin{bmatrix} [e_{0,0}, e_{0,1}] & & & & 0 \\ & [e_{1,0}, e_{1,1}] & & & \\ & & [e_{2,0}, e_{2,1}] & & \\ & & & \ddots & \\ 0 & & & & [e_{M-1,0}, e_{M-1,1}] \end{bmatrix} \cdot$$

$$(U \otimes I_{2 \times 2}),$$

where $e_{i,0}$ is a column selection vector having a length of 8 (because $L_i=8$). When $e_{i,0}$ is a unit vector, it may include one element of 1 (indicating that the beams corresponding to this column may be selected) and the other elements of 0. For one antenna group, in order to ensure the selected two beams to be orthogonal to each other, there are four possible column selection sections, i.e., $$[e_{i,0}, e_{i,1}] \in \left\{ \begin{bmatrix} 1 & 0 \\ 0 & 0 \\ 0 & 0 \\ 0 & 0 \\ 0 & 1 \\ 0 & 0 \\ 0 & 0 \\ 0 & 0 \end{bmatrix}, \begin{bmatrix} 0 & 0 \\ 1 & 0 \\ 0 & 0 \\ 0 & 0 \\ 0 & 0 \\ 0 & 1 \\ 0 & 0 \\ 0 & 0 \end{bmatrix}, \begin{bmatrix} 0 & 0 \\ 0 & 0 \\ 1 & 0 \\ 0 & 0 \\ 0 & 0 \\ 0 & 0 \\ 0 & 1 \\ 0 & 0 \end{bmatrix}, \begin{bmatrix} 0 & 0 \\ 0 & 0 \\ 0 & 0 \\ 1 & 0 \\ 0 & 0 \\ 0 & 0 \\ 0 & 0 \\ 0 & 1 \end{bmatrix} \right\}.$$

Hence, there exist $4^M$ possible combinations for the column selection sections of $W_2$.

The phase adjustment matrix U among the antenna groups is an $M \times r_2$ matrix, and it may be expressed as:

$$U = [u_0 \ u_1 \ \ldots \ u_{r_2-1}] = \begin{bmatrix} u_{0,0} & u_{0,1} & \ldots & u_{0,r_2-1} \\ u_{1,0} & u_{1,1} & \ldots & u_{1,r_2-1} \\ \vdots & \vdots & \vdots & \vdots \\ u_{M-1,0} & u_{M-1,1} & \ldots & u_{M-1,r_2-1} \end{bmatrix}.$$

Assume there are Q phase adjustment matrices, i.e., $U_0$, $U_1$, $U_2$, ..., $U_{Q-1}$. In this regard, the second-level codebook may include $4^M \cdot Q$ codewords, and $i_2$ ($i_2=0, 1, \ldots, 4^M \cdot Q-1$) may be adopted as a PMI to indicate and feed back the precoding matrix. As mentioned above, $r_2$ is a minimum integer greater than or equal to $$\frac{r}{r_1},$$

so $$r_2 = \left\lceil \frac{r+1}{2} \right\rceil.$$

For the codebook where rank=4, M=2 as shown in Table 3. The phase adjustment matrices U may be adopted to directly extend a codebook of a 2-antenna LTE system (where rank=2) as follows:

$$\left\{ \frac{1}{\sqrt{2}} \begin{bmatrix} 1 & 1 \\ 1 & -1 \end{bmatrix}, \frac{1}{\sqrt{2}} \begin{bmatrix} 1 & 1 \\ e^{j\frac{\pi}{4}} & -e^{j\frac{\pi}{4}} \end{bmatrix}, \frac{1}{\sqrt{2}} \begin{bmatrix} 1 & 1 \\ j & -j \end{bmatrix}, \frac{1}{\sqrt{2}} \begin{bmatrix} 1 & 1 \\ e^{j\frac{3\pi}{4}} & -e^{j\frac{3\pi}{4}} \end{bmatrix} \right\}.$$

Hence, there are Q=4 possible combinations for the phase adjustment sections of $W_2$.

The precoding matrix may be normalized so as to acquire the final precoding matrix. When each antenna group is a two-dimensional antenna array and the above phase adjustment matrix among the antenna groups is adopted, the normalization operation may be performed using the following equation:

$$W = \frac{1}{\sqrt{N_h N_v \cdot r}} \begin{bmatrix} X_0 & & & 0 \\ & X_1 & & \\ & & X_2 & \\ & & & \ddots \\ 0 & & & X_{M-1} \end{bmatrix} \times col_r \left( \begin{bmatrix} u_{0,0}e_{0,0} & u_{0,0}e_{0,1} & u_{0,1}e_{0,0} & u_{0,1}e_{0,1} & \ldots & u_{0,r_2-1}e_{0,0} & u_{0,r_2-1}e_{0,1} \\ u_{1,0}e_{1,0} & u_{1,0}e_{1,1} & u_{1,1}e_{1,0} & u_{1,1}e_{1,1} & \ldots & u_{1,r_2-1}e_{1,0} & u_{1,r_2-1}e_{1,1} \\ u_{2,0}e_{2,0} & u_{2,0}e_{2,1} & u_{2,1}e_{2,0} & u_{2,1}e_{2,1} & \ldots & u_{2,r_2-1}e_{2,0} & u_{2,r_2-1}e_{2,1} \\ \vdots & & & & & \vdots & \\ u_{M-1,0}e_{M-1,0} & u_{M-1,0}e_{M-1,1} & u_{M-1,1}e_{M-1,0} & u_{M-1,1}e_{M-1,1} & \ldots & u_{M-1,r_2-1}e_{M-1,0} & u_{M-1,r_2-1}e_{M-1,1} \end{bmatrix} \right),$$

where $N_h$ represents the quantity of the antennas in the first dimension in the antenna group, $N_v$ represents the quantity of the antennas in the second dimension in the antenna group, r represents the quantity of the data streams, and $col_r(\bullet)$ represents the r columns to be selected.

In a possible embodiment of the present disclosure, presumed that $[e_{0,0}, e_{0,1}]=[e_{1,0}, e_{1,1}]= \ldots =[e_{M-1,0}, e_{M-1,1}]$ and an $i^{th}$ one in the column selection combinations is adopted, the precoding matrix W may be calculated using the following equation:

$$W = \frac{1}{\sqrt{N_h N_v \cdot r}} col_r \left( \begin{bmatrix} u_{0,0}X_0(:,i) & u_{0,0}X_0(:,i+4) & \ldots & u_{0,r_2-1}X_0(:,i) & u_{0,r_2-1}X_0(:,i+4) \\ u_{1,0}X_1(:,i) & u_{1,0}X_1(:,i+4) & \ldots & u_{1,r_2-1}X_1(:,i) & u_{1,r_2-1}X_0(:,i+4) \\ u_{2,0}X_2(:,i) & u_{2,0}X_2(:,i+4) & \ldots & u_{2,r_2-1}X_2(:,i) & u_{2,r_2-1}X_0(:,i+4) \\ \vdots & \vdots & & & \\ u_{M-1,0}X_{M-1}(:,i) & u_{M-1,0}X_{M-1}(:,i+4) & \ldots & u_{M-1,r_2-1}X_{M-1}(:,i) & u_{M-1,r_2-1}X_{M-1}(:,i+4) \end{bmatrix} \right),$$

where $X_i(:,i)$ represents an $i^{th}$ column of the matrix to be selected.

Presumed that $X_0=X_1= \ldots =X_{M-1}$ and $[e_{0,0}, e_{0,1}]=[e_{1,0}, e_{1,1}]= \ldots =[e_{M-1,0}, e_{M-1,1}]$, the codebook where $r_1=2$, M=2 and rank=4 may be shown in Table 4.

TABLE 4 codebook where the quantity M of the antenna groups is M = 2 and the quantity r of the data streams is r = 4

| $i_{1,1}, i_{1,2}$ | $i_2$ | | | |
|---|---|---|---|---|
| | 0 | 1 | 2 | 3 |
| $i_{1,1} = 0, 1, \ldots, N_h O_1/2 - 1$<br>$i_{1,2} = 0, 1, \ldots, N_v O_2/2 - 1$ | $W_{(2i_{1,1}, 2i_{1,2})}^{(4)}$ | $W_{(2i_{1,1}, 2i_{1,2}+1)}^{(4)}$ | $W_{(2i_{1,1}+1, 2i_{1,2})}^{(4)}$ | $W_{(2i_{1,1}+1, 2i_{1,2}+1)}^{(4)}$ |

| $i_{1,1}, i_{1,2}$ | $i_2$ | | | |
|---|---|---|---|---|
| | 4 | 5 | 6 | 7 |
| $i_{1,1} = 0, 1, \ldots, N_h O_1/2 - 1$<br>$i_{1,2} = 0, 1, \ldots, N_v O_2/2 - 1$ | $\tilde{W}_{(2i_{1,1}, 2i_{1,2})}^{(4)}$ | $\tilde{W}_{(2i_{1,1}, 2i_{1,2}+1)}^{(4)}$ | $\tilde{W}_{(2i_{1,1}+1, 2i_{1,2})}^{(4)}$ | $\tilde{W}_{(2i_{1,1}+1, 2i_{1,2}+1)}^{(4)}$ |

| $i_{1,1}$ | $i_2$ | | | |
|---|---|---|---|---|
| | 8 | 9 | 10 | 11 |
| $i_{1,1} = 0, 1, \ldots, N_h O_1/2 - 1$<br>$i_{1,2} = 0, 1, \ldots, N_v O_2/2 - 1$ | $\overline{W}_{(2i_{1,1}, 2i_{1,2})}^{(4)}$ | $\overline{W}_{(2i_{1,1}, 2i_{1,2}+1)}^{(4)}$ | $\overline{W}_{(2i_{1,1}+1, 2i_{1,2})}^{(4)}$ | $\overline{W}_{(2i_{1,1}+1, 2i_{1,2}+1)}^{(4)}$ |

| $i_{1,1}$ | $i_2$ | | | |
|---|---|---|---|---|
| | 12 | 13 | 14 | 15 |
| $i_{1,1} = 0, 1, \ldots, N_h O_1/2 - 1$<br>$i_{1,2} = 0, 1, \ldots, N_v O_2/2 - 1$ | $\hat{W}_{(2i_{1,1}, 2i_{1,2})}^{(4)}$ | $\hat{W}_{(2i_{1,1}, 2i_{1,2}+1)}^{(4)}$ | $\hat{W}_{(2i_{1,1}+1, 2i_{1,2})}^{(4)}$ | $\hat{W}_{(2i_{1,1}+1, 2i_{1,2}+1)}^{(4)}$ | where $$W_{(m_1, m_2)}^{(4)} = \frac{1}{\sqrt{2 N_h N_v \cdot r}} \cdot \begin{bmatrix} v_{mod(m_2, N_v O_2)} \otimes & v_{mod(m_2, N_v O_2)} \otimes & v_{mod(m_2, N_v O_2)} \otimes & v_{mod(m_2, N_v O_2)} \otimes \\ h_{mod(m_1, N_h O_1)} & h_{mod(m_1+O_1, N_h O_1)} & h_{mod(m_1, N_h O_1)} & h_{mod(m_1+O_1, N_h O_1)} \\ v_{mod(m_2, N_v O_2)} \otimes & v_{mod(m_2, N_v O_2)} \otimes & -1 \cdot v_{mod(m_2, N_v O_2)} \otimes & -1 \cdot v_{mod(m_2, N_v O_2)} \otimes \\ h_{mod(m_1, N_h O_1)} & h_{mod(m_1+O_1, N_h O_1)} & h_{mod(m_1, N_h O_1)} & h_{mod(m_1+O_1, N_h O_1)} \end{bmatrix}$$

$$\tilde{W}_{(m_1, m_2)}^{(4)} = \frac{1}{\sqrt{2 N_h N_v \cdot r}} \cdot \begin{bmatrix} v_{mod(m_2, N_v O_2)} \otimes & v_{mod(m_2, N_v O_2)} \otimes & v_{mod(m_2, N_v O_2)} \otimes & v_{mod(m_2, N_v O_2)} \otimes \\ h_{mod(m_1, N_h O_1)} & h_{mod(m_1+O_1, N_h O_1)} & h_{mod(m_1, N_h O_1)} & h_{mod(m_1+O_1, N_h O_1)} \\ e^{j\frac{\pi}{4}} \cdot v_{mod(m_2, N_v O_2)} \otimes & e^{j\frac{\pi}{4}} \cdot v_{mod(m_2, N_v O_2)} \otimes & -e^{j\frac{\pi}{4}} \cdot v_{mod(m_2, N_v O_2)} \otimes & -e^{j\frac{\pi}{4}} \cdot v_{mod(m_2, N_v O_2)} \otimes \\ h_{mod(m_1, N_h O_1)} & h_{mod(m_1+O_1, N_h O_1)} & h_{mod(m_1, N_h O_1)} & h_{mod(m_1+O_1, N_h O_1)} \end{bmatrix}$$

$$\overline{W}_{(m_1, m_2)}^{(4)} = \frac{1}{\sqrt{2 N_h N_v \cdot r}} \cdot \begin{bmatrix} v_{mod(m_2, N_v O_2)} \otimes & v_{mod(m_2, N_v O_2)} \otimes & v_{mod(m_2, N_v O_2)} \otimes & v_{mod(m_2, N_v O_2)} \otimes \\ h_{mod(m_1, N_h O_1)} & h_{mod(m_1+O_1, N_h O_1)} & h_{mod(m_1, N_h O_1)} & h_{mod(m_1+O_1, N_h O_1)} \\ j \cdot v_{mod(m_2, N_v O_2)} \otimes & j \cdot v_{mod(m_2, N_v O_2)} \otimes & -j \cdot v_{mod(m_2, N_v O_2)} \otimes & -j \cdot v_{mod(m_2, N_v O_2)} \otimes \\ h_{mod(m_1, N_h O_1)} & h_{mod(m_1+O_1, N_h O_1)} & h_{mod(m_1, N_h O_1)} & h_{mod(m_1+O_1, N_h O_1)} \end{bmatrix}$$

$$\hat{W}_{(m_1, m_2)}^{(4)} = \frac{1}{\sqrt{2 N_h N_v \cdot r}} \cdot \begin{bmatrix} v_{mod(m_2, N_v O_2)} \otimes & v_{mod(m_2, N_v O_2)} \otimes & v_{mod(m_2, N_v O_2)} \otimes & v_{mod(m_2, N_v O_2)} \otimes \\ h_{mod(m_1, N_h O_1)} & h_{mod(m_1+O_1, N_h O_1)} & h_{mod(m_1, N_h O_1)} & h_{mod(m_1+O_1, N_h O_1)} \\ e^{j\frac{3\pi}{4}} \cdot v_{mod(m_2, N_v O_2)} \otimes & e^{j\frac{3\pi}{4}} \cdot v_{mod(m_2, N_v O_2)} \otimes & -e^{j\frac{3\pi}{4}} \cdot v_{mod(m_2, N_v O_2)} \otimes & -e^{j\frac{3\pi}{4}} \cdot v_{mod(m_2, N_v O_2)} \otimes \\ h_{mod(m_1, N_h O_1)} & h_{mod(m_1+O_1, N_h O_1)} & h_{mod(m_1, N_h O_1)} & h_{mod(m_1+O_1, N_h O_1)} \end{bmatrix}$$

Example 3

For the dual-polarized antenna array, when the $r_1$ beams selected from the beam group are not orthogonal to each other, in a possible embodiment of the present disclosure, $r_1=2$, and the antenna groups each include a same quantity of antenna elements, i.e., $N_0=N_1=\ldots=N_{M-1}$.

For example, the relationship between the quantity of the antenna groups of the antenna array and the rank r of the precoding matrix is shown in Table 5.

TABLE 5 relationship between the quantity of antenna groups of antenna array and rank of precoding matrix

| Rank $r$ of precoding matrix | The quantity $M$ of the antenna groups of antenna array |
| --- | --- |
| 1 | 2 |
| 2 | 2 |
| 3 | 4 |
| 4 | 4 |
| 5 | 8 |
| 6 | 8 |
| 7 | 8 |
| 8 | 8 |

In this way, two antenna groups may form a superior group, and there are $$\frac{M}{2}$$

superior groups. In a possible embodiment of the present disclosure, the beams for each antenna groups may be selected from a same set of beam vectors, and the quantity $L_i$ of the beams included in the beam group matrices $X_i$ may be the same.

$W_1$ may be constructed as follows:

$$W_1 = \begin{bmatrix} X_0 & & & & 0 \\ & X_1 & & & \\ & & X_2 & & \\ & & & \ddots & \\ 0 & & & & X_{M-1} \end{bmatrix}.$$

$W_1$ may be constructed in a same way as Example 1, which will not be particularly defined herein. Because $r_1=2$, every two antenna groups may form one superior group. For example, every two adjacent antenna groups may form one superior group, e.g., $[X_0,X_1]$, $[X_2,X_3]$, and the like. In a possible embodiment of the present disclosure, the beam groups for the two antenna groups in each superior group may be the same, i.e., $X_0=X_1$, $X_2=X_3$, ..., $X_{M-2}=X_{M-1}$.

$W_2$ may be constructed as follows. Because $r_1=2$, $$W_2' = \begin{bmatrix} [e_{0,0}, e_{0,1}] & & & & 0 \\ & [e_{1,0}, e_{1,1}] & & & \\ & & [e_{2,0}, e_{2,1}] & & \\ & & & \ddots & \\ 0 & & & & [e_{M-1,0}, e_{M-1,1}] \end{bmatrix} \cdot (U \otimes V).$$

As mentioned in Example 1, $e_{i,0}$ and $e_{i,1}$ are column selection vectors each having a length of 4 (because $L_i=4$). When each of $e_{i,0}$ and $e_{i,1}$ is a unit vector, it may include one element of 1 (indicating that the beams corresponding to this column may be selected) and the other elements of 0. For one antenna group, it is unnecessary for the two column vectors to be orthogonal to each other and two same beams may be selected, so there are 10 possible column selection sections, i.e., $$[e_{i,0}, e_{i,1}] \in \left\{ \begin{bmatrix} 1 & 1 \\ 0 & 0 \\ 0 & 0 \\ 0 & 0 \end{bmatrix}, \begin{bmatrix} 1 & 0 \\ 0 & 1 \\ 0 & 0 \\ 0 & 0 \end{bmatrix}, \begin{bmatrix} 1 & 0 \\ 0 & 0 \\ 0 & 1 \\ 0 & 0 \end{bmatrix}, \begin{bmatrix} 1 & 0 \\ 0 & 0 \\ 0 & 0 \\ 0 & 1 \end{bmatrix}, \right.$$

$$\left. \begin{bmatrix} 0 & 0 \\ 1 & 1 \\ 0 & 0 \\ 0 & 0 \end{bmatrix}, \begin{bmatrix} 0 & 0 \\ 1 & 0 \\ 0 & 1 \\ 0 & 0 \end{bmatrix}, \begin{bmatrix} 0 & 0 \\ 1 & 0 \\ 0 & 0 \\ 0 & 1 \end{bmatrix}, \begin{bmatrix} 0 & 0 \\ 0 & 0 \\ 1 & 1 \\ 0 & 0 \end{bmatrix}, \begin{bmatrix} 0 & 0 \\ 0 & 0 \\ 1 & 0 \\ 0 & 1 \end{bmatrix}, \begin{bmatrix} 0 & 0 \\ 0 & 0 \\ 0 & 0 \\ 1 & 1 \end{bmatrix} \right\}.$$

In a possible embodiment of the present disclosure, the two antenna groups in each superior group may select the same beams, i.e., $[e_{0,0},e_{0,1}]=[e_{1,0},e_{1,1}]$, $[e_{2,0},e_{2,1}]=[e_{3,0},e_{3,1}]=\ldots=[e_{M-2,0},e_{M-2,1}]=[e_{M-1,0},e_{M-1,1}]$.

The phase adjustment matrix V ($V=[V'(:,1)\otimes e_2^{(1)}\ V'(:,2)\otimes e_2^{(2)}]$) in each superior group is a 4×2 matrix, where $$V' = \begin{bmatrix} \alpha_0 & \beta_0 \\ \alpha_1 & \beta_1 \end{bmatrix},$$

i.e., a 2×2 orthogonal matrix which may be constructed using the construction method mentioned in Example 1. For example, V' may be constructed through Householder transform. A possible set of the matrices V' may be $$\left\{ \frac{1}{\sqrt{2}}\begin{bmatrix} 1 & 1 \\ 1 & -1 \end{bmatrix}, \frac{1}{\sqrt{2}}\begin{bmatrix} 1 & 1 \\ e^{j\frac{\pi}{4}} & -e^{j\frac{\pi}{4}} \end{bmatrix}, \frac{1}{\sqrt{2}}\begin{bmatrix} 1 & 1 \\ j & -j \end{bmatrix}, \frac{1}{\sqrt{2}}\begin{bmatrix} 1 & 1 \\ e^{j\frac{3\pi}{4}} & -e^{j\frac{3\pi}{4}} \end{bmatrix} \right\}.$$

The phase adjustment matrix U among the superior groups is a $$\frac{M}{2} \times r_2$$

orthogonal matrix, where $r_2$ is a minimum integer greater than or equal to $$\frac{r}{2}.$$

U may be expressed as:

$$U = \begin{bmatrix} u_{0,0} & u_{0,1} & \cdots & u_{0,r_2-1} \\ u_{1,0} & u_{1,1} & \cdots & u_{1,r_2-1} \\ \vdots & \vdots & \vdots & \vdots \\ u_{M/2-1,0} & u_{M/2-1,1} & \cdots & u_{M/2-1,r_2-1} \end{bmatrix}.$$

It may also be constructed using the construction method mentioned in Example 1. When r=8, U may be constructed through Householder transform, and a possible set of the matrices U may be $$\left\{ \frac{1}{2}\begin{bmatrix} 1 & 1 & 1 & 1 \\ 1 & 1 & -1 & -1 \\ 1 & -1 & 1 & -1 \\ 1 & -1 & -1 & 1 \end{bmatrix}, \frac{1}{2}\begin{bmatrix} 1 & -j & -1 & j \\ j & 1 & j & 1 \\ -1 & -j & 1 & j \\ -j & 1 & -j & 1 \end{bmatrix}, \frac{1}{2}\begin{bmatrix} 1 & -1 & 1 & -1 \\ 1 & 1 & -1 & -1 \\ 1 & 1 & 1 & 1 \\ 1 & -1 & -1 & -1 \end{bmatrix}, \frac{1}{2}\begin{bmatrix} -1 & j & 1 & -j \\ -j & 1 & -j & 1 \\ 1 & j & -1 & -j \\ j & 1 & j & 1 \end{bmatrix} \right\}.$$

Upon the acquisition of the first-level codebook and the second-level codebook as mentioned above, one matrix in the first-level codebook may be multiplied by one matrix in the second-level codebook, and a resultant matrix may be normalized so as to acquire the precoding matrix in the codebook. When each antenna group is a two-dimensional antenna array, the following normalization operation may be performed:

$$W = \frac{1}{\sqrt{N_h N_v \cdot r}} \begin{bmatrix} X_0 & & & & 0 \\ & X_1 & & & \\ & & X_2 & & \\ & & & \ddots & \\ 0 & & & & X_{M-1} \end{bmatrix}$$

$$\times col_r$$

$$\left( \begin{bmatrix} u_{0,0}\alpha_0 e_{0,0} & u_{0,0}\beta_0 e_{0,1} & u_{0,1}\alpha_0 e_{0,0} & u_{0,1}\beta_0 e_{0,1} & \cdots & u_{0,r_2-1}\alpha_0 e_{0,0} & u_{0,r_2-1}\beta_0 e_{0,1} \\ u_{0,0}\alpha_1 e_{1,0} & u_{0,0}\beta_1 e_{1,1} & u_{0,1}\alpha_1 e_{1,0} & u_{0,1}\beta_1 e_{1,1} & \cdots & u_{0,r_2-1}\alpha_1 e_{1,0} & u_{0,r_2-1}\beta_1 e_{1,1} \\ u_{1,0}\alpha_0 e_{2,0} & u_{1,0}\beta_0 e_{2,1} & u_{1,1}\alpha_0 e_{2,0} & u_{1,1}\beta_0 e_{2,1} & \cdots & u_{1,r_2-1}\alpha_0 e_{2,0} & u_{1,r_2-1}\beta_0 e_{2,1} \\ u_{1,0}\alpha_1 e_{3,0} & u_{1,0}\beta_1 e_{3,1} & u_{1,1}\alpha_1 e_{3,0} & u_{1,1}\beta_1 e_{3,1} & \cdots & u_{1,r_2-1}\alpha_1 e_{3,0} & u_{1,r_2-1}\beta_1 e_{3,1} \\ \vdots & \vdots & \vdots & \vdots & & \vdots & \vdots \\ u_{Mi2-1,0}\alpha_0 e_{M-2,0} & u_{Mi2-1,0}\beta_0 e_{M-2,0} & u_{Mi2-1,1}\alpha_0 e_{M-2,0} & u_{Mi2-1,1}\beta_0 e_{M-2,0} & \cdots & u_{Mi2-1,r_2-1}\alpha_0 e_{M-2,0} & u_{Mi2-1,r_2-1}\beta_0 e_{M-2,0} \\ u_{Mi2-1,0}\alpha_1 e_{M-1,0} & u_{Mi2-1,0}\beta_1 e_{M-1,0} & u_{Mi2-1,1}\alpha_1 e_{M-1,0} & u_{Mi2-1,1}\beta_1 e_{M-1,0} & \cdots & u_{Mi2-1,r_2-1}\alpha_1 e_{M-1,0} & u_{Mi2-1,r_2-1}\beta_1 e_{M-1,0} \end{bmatrix} \right),$$

where $N_h$ represents the quantity of the antennas in the first dimension in the antenna group, $N_v$ represents the quantity of the antennas in the second dimension in the antenna group, r represents the quantity of the data streams, and $col_r(\bullet)$ represents the r columns to be selected.

In a possible embodiment of the present disclosure, presumed that $[e_{0,0},e_{0,1}]=[e_{1,0},e_{1,1}]=\ldots=[e_{M-1,0},e_{M-1,1}]$ and an $i^{th}$ vector and a $j^{th}$ vector in the four column selection combinations are adopted, the precoding matrix W may be calculated using the following equation:

$$W = \frac{1}{\sqrt{N_h N_v \cdot r}}$$

$$\times col_r$$

$$\left( \begin{bmatrix} u_{0,0}\alpha_0 X_0(:,j) & u_{0,0}\beta_0 X_0(:,j) & u_{0,1}\alpha_0 X_0(:,j) & u_{0,1}\beta_0 X_0(:,j) & \cdots \\ u_{0,0}\alpha_1 X_1(:,j) & u_{0,0}\beta_1 X_1(:,j) & u_{0,1}\alpha_1 X_1(:,j) & u_{0,1}\beta_1 X_1(:,j) & \cdots \\ u_{1,0}\alpha_0 X_2(:,j) & u_{1,0}\beta_0 X_2(:,j) & u_{1,1}\alpha_0 X_2(:,j) & u_{1,1}\beta_0 X_2(:,j) & \cdots \\ u_{1,0}\alpha_1 X_3(:,j) & u_{1,0}\beta_1 X_3(:,j) & u_{1,1}\alpha_1 X_3(:,j) & u_{1,1}\beta_1 X_3(:,j) & \cdots \\ \vdots & \vdots & \vdots & \vdots & \\ u_{Mi2-1,0}\alpha_0 X_{M-2}(:,j) & u_{Mi2-1,0}\beta_0 X_{M-2}(:,j) & u_{Mi2-1,1}\alpha_0 X_{M-2}(:,j) & u_{Mi2-1,1}\beta_0 X_{M-2}(:,j) & \cdots \\ u_{Mi2-1,0}\alpha_1 X_{M-1}(:,j) & u_{Mi2-1,0}\beta_1 X_{M-1}(:,j) & u_{Mi2-1,1}\alpha_1 X_{M-1}(:,j) & u_{Mi2-1,1}\beta_1 X_{M-1}(:,j) & \cdots \end{bmatrix} \right)$$

-continued $$\begin{bmatrix} u_{0,r_2-1}\alpha_0 X_0(:,j) & u_{0,r_2-1}\beta_0 X_0(:,j) \\ u_{0,r_2-1}\alpha_1 X_1(:,j) & u_{0,r_2-1}\beta_1 X_1(:,j) \\ u_{1,r_2-1}\alpha_0 X_2(:,j) & u_{1,r_2-1}\beta_0 X_2(:,j) \\ u_{1,r_2-1}\alpha_1 X_3(:,j) & u_{1,r_2-1}\beta_1 X_3(:,j) \\ \vdots & \vdots \\ u_{Mi2-1,r_2-1}\alpha_0 X_{M-2}(:,j) & u_{Mi2-1,r_2-1}\beta_0 X_{M-2}(:,j) \\ u_{Mi2-1,r_2-1}\alpha_1 X_{M-1}(:,j) & u_{Mi2-1,r_2-1}\beta_1 X_{M-1}(:,j) \end{bmatrix}$$

where $X_i(:,i)$ represents an $i^{th}$ column of the matrix to be selected.

Presumed that $X_0=X_1=\ldots=X_{M-1}$, each beam group for each antenna group includes four beams and $[e_{0,0},e_{0,1}]=[e_{1,0},e_{1,1}]=\ldots=[e_{M-1,0},e_{M-1,1}]$, the codebook where $r_1=2$, $M=4$ and rank=4 may be shown in Table 6.

TABLE 6 codebook where the quantity M of the antenna groups is M = 4 and the quantity r of the data streams is r = 4

| $i_{1,1}, i_{1,2}$ | $i_2$ | | | |
|---|---|---|---|---|
| | 0 | 1 | 2 | 3 |
| $i_{1,1} = 0,1,\ldots,N_hO_1/2-1$ $i_{1,2} = 0,1,\ldots,N_vO_2/2-1$ | $w^{(4)}_{(2i_{1,1},2i_{1,1},2i_{1,2})}$ | $w^{(4)}_{(2i_{1,1}+1,2i_{1,2},2i_{1,1}+1,2i_{1,2})}$ | $w^{(4)}_{(2i_{1,1}+2,2i_{1,2},2i_{1,1}+2,2i_{1,2})}$ | $w^{(4)}_{(2i_{1,1}+3,2i_{1,2},2i_{1,1}+3,2i_{1,2})}$ |

| $i_{1,1}$ | $i_2$ | | | |
|---|---|---|---|---|
| | 4 | 5 | 6 | 7 |
| $i_{1,1} = 0,1,\ldots,N_hO_1/2-1$ $i_{1,2} = 0,1,\ldots,N_vO_2/2-1$ | $w^{(4)}_{(2i_{1,1},2i_{1,2},2i_{1,1}+1,2i_{1,2})}$ | $w^{(4)}_{(2i_{1,1}+1,2i_{1,2},2i_{1,1}+2,2i_{1,2})}$ | $w^{(4)}_{(2i_{1,1},2i_{1,2},2i_{1,1}+3,2i_{1,2})}$ | $w^{(4)}_{(2i_{1,1}+1,2i_{1,2},2i_{1,1}+3,2i_{1,2})}$ |

| $i_{1,1}, i_{1,2}$ | $i_2$ | | | |
|---|---|---|---|---|
| | 8 | 9 | 10 | 11 |
| $i_{1,1} = 0,1,\ldots,N_hO_1/2-1$ $i_{1,2} = 0,1,\ldots,N_vO_2/2-1$ | $\tilde{w}^{(4)}_{(2i_{1,1},2i_{1,1},2i_{1,2})}$ | $\tilde{w}^{(4)}_{(2i_{1,1}+1,2i_{1,2},2i_{1,1}+1,2i_{1,2})}$ | $\tilde{w}^{(4)}_{(2i_{1,1}+2,2i_{1,2},2i_{1,1}+2,2i_{1,2})}$ | $\tilde{w}^{(4)}_{(2i_{1,1}+3,2i_{1,2},2i_{1,1}+3,2i_{1,2})}$ |

| $i_{1,1}$ | $i_2$ | | | |
|---|---|---|---|---|
| | 12 | 13 | 14 | 15 |
| $i_{1,1} = 0,1,\ldots,N_hO_1/2-1$ $i_{1,2} = 0,1,\ldots,N_vO_2/2-1$ | $\tilde{w}^{(4)}_{(2i_{1,1},2i_{1,2},2i_{1,1}+1,2i_{1,2})}$ | $\tilde{w}^{(4)}_{(2i_{1,1}+1,2i_{1,2},2i_{1,1}+2,2i_{1,2})}$ | $\tilde{w}^{(4)}_{(2i_{1,1},2i_{1,2},2i_{1,1}+3,2i_{1,2})}$ | $\tilde{w}^{(4)}_{(2i_{1,1}+1,2i_{1,2},2i_{1,1}+3,2i_{1,2})}$ |

| $i_{1,1}, i_{1,2}$ | $i_2$ | | | |
|---|---|---|---|---|
| | 16 | 17 | 18 | 19 |
| $i_{1,1} = 0,1,\ldots,N_hO_1/2-1$ $i_{1,2} = 0,1,\ldots,N_vO_2/2-1$ | $\overline{w}^{(4)}_{(2i_{1,1},2i_{1,1},2i_{1,2})}$ | $\overline{w}^{(4)}_{(2i_{1,1}+1,2i_{1,2},2i_{1,1}+1,2i_{1,2})}$ | $\overline{w}^{(4)}_{(2i_{1,1}+2,2i_{1,2},2i_{1,1}+2,2i_{1,2})}$ | $\overline{w}^{(4)}_{(2i_{1,1}+3,2i_{1,2},2i_{1,1}+3,2i_{1,2})}$ |

| $i_{1,1}$ | $i_2$ | | | |
|---|---|---|---|---|
| | 20 | 21 | 22 | 23 |
| $i_{1,1} = 0,1,\ldots,N_hO_1/2-1$ $i_{1,2} = 0,1,\ldots,N_vO_2/2-1$ | $\overline{w}^{(4)}_{(2i_{1,1},2i_{1,2},2i_{1,1}+1,2i_{1,2})}$ | $\overline{w}^{(4)}_{(2i_{1,1}+1,2i_{1,2},2i_{1,1}+2,2i_{1,2})}$ | $\overline{w}^{(4)}_{(2i_{1,1},2i_{1,2},2i_{1,1}+3,2i_{1,2})}$ | $\overline{w}^{(4)}_{(2i_{1,1}+1,2i_{1,2},2i_{1,1}+3,2i_{1,2})}$ |

| $i_{1,1}, i_{1,2}$ | $i_2$ | | | |
|---|---|---|---|---|
| | 24 | 25 | 26 | 27 |
| $i_{1,1} = 0,1,\ldots,N_hO_1/2-1$ $i_{1,2} = 0,1,\ldots,N_vO_2/2-1$ | $\hat{w}^{(4)}_{(2i_{1,1},2i_{1,1},2i_{1,2})}$ | $\hat{w}^{(4)}_{(2i_{1,1}+1,2i_{1,2},2i_{1,1}+1,2i_{1,2})}$ | $\hat{w}^{(4)}_{(2i_{1,1}+2,2i_{1,2},2i_{1,1}+2,2i_{1,2})}$ | $\hat{w}^{(4)}_{(2i_{1,1}+3,2i_{1,2},2i_{1,1}+3,2i_{1,2})}$ |

TABLE 6-continued codebook where the quantity M of the antenna groups is
M = 4 and the quantity r of the data streams is r = 4

| $i_{1,1}$ | $i_2$ | | | |
|---|---|---|---|---|
| | 28 | 29 | 30 | 11 |
| $i_{1,1} = 0,1,\ldots,N_hO_1/2-1$ $i_{1,2} = 0,1,\ldots,N_vO_2/2-1$ | $\hat{w}^{(4)}_{(2i_{1,1},2i_{1,2},2i_{1,1}+1,2i_{1,2})}$ | $\hat{w}^{(4)}_{(2i_{1,1}+1,2i_{1,2},2i_{1,1}+2,2i_{1,2})}$ | $\hat{w}^{(4)}_{(2i_{1,1},2i_{1,2},2i_{1,1}+3,2i_{1,2})}$ | $\hat{w}^{(4)}_{(2i_{1,1}+1,2i_{1,2},2i_{1,1}+3,2i_{1,2})}$ |

$$W^{(4)}_{(m_1,m_2,m'_1,m'_2)} = \frac{1}{\sqrt{4N_hN_v \cdot r}} \cdot$$

$$\begin{bmatrix} v_{mod(m_2,N_vO_2)} \otimes h_{mod(m_1,N_hO_1)} v_{mod(m'_2,N_vO_2)} \otimes h_{mod(m'_1,N_hO_1)} v_{mod(m_2,N_vO_2)} \otimes h_{mod(m_1,N_hO_1)} v_{mod(m'_2,N_vO_2)} \otimes h_{mod(m'_1,N_hO_1)} \\ v_{mod(m_2,N_vO_2)} \otimes h_{mod(m_1,N_hO_1)} - 1 \cdot v_{mod(m'_2,N_vO_2)} \otimes h_{mod(m'_1,N_hO_1)} v_{mod(m_2,N_vO_2)} \otimes h_{mod(m_1,N_hO_1)} - 1 \cdot v_{mod(m'_2,N_vO_2)} \otimes h_{mod(m'_1,N_hO_1)} \\ e^{j\frac{\pi}{4}} \cdot v_{mod(m_2,N_vO_2)} \otimes h_{mod(m_1,N_hO_1)} e^{j\frac{\pi}{4}} \cdot v_{mod(m'_2,N_vO_2)} \otimes h_{mod(m'_1,N_hO_1)} - e^{j\frac{\pi}{4}} \cdot v_{mod(m_2,N_vO_2)} \otimes h_{mod(m_1,N_hO_1)} - e^{j\frac{\pi}{4}} \cdot v_{mod(m'_2,N_vO_2)} \otimes h_{mod(m'_1,N_hO_1)} \\ e^{j\frac{\pi}{4}} v_{mod(m_2,N_vO_2)} \otimes h_{mod(m_1,N_hO_1)} - e^{j\frac{\pi}{4}} v_{mod(m'_2,N_vO_2)} \otimes h_{mod(m'_1,N_hO_1)} - e^{j\frac{\pi}{4}} \cdot v_{mod(m_2,N_vO_2)} \otimes h_{mod(m_1,N_hO_1)} e^{j\frac{\pi}{4}} \cdot v_{mod(m'_2,N_vO_2)} \otimes h_{mod(m'_1,N_hO_1)} \end{bmatrix}$$

$$\tilde{w}^{(4)}_{(m_1,m_2,m'_1,m'_2)} = \frac{1}{\sqrt{4N_hN_v \cdot r}} \cdot$$

$$\begin{bmatrix} v_{mod(m_2,N_vO_2)} \otimes h_{mod(m_1,N_hO_1)} v_{mod(m'_2,N_vO_2)} \otimes h_{mod(m'_1,N_hO_1)} v_{mod(m_2,N_vO_2)} \otimes h_{mod(m_1,N_hO_1)} v_{mod(m'_2,N_vO_2)} \otimes h_{mod(m'_1,N_hO_1)} \\ v_{mod(m_2,N_vO_2)} \otimes h_{mod(m_1,N_hO_1)} - 1 \cdot v_{mod(m'_2,N_vO_2)} \otimes h_{mod(m'_1,N_hO_1)} v_{mod(m_2,N_vO_2)} \otimes h_{mod(m_1,N_hO_1)} - 1 \cdot v_{mod(m'_2,N_vO_2)} \otimes h_{mod(m'_1,N_hO_1)} \\ e^{j\frac{3\pi}{4}} \cdot v_{mod(m_2,N_vO_2)} \otimes h_{mod(m_1,N_hO_1)} e^{j\frac{3\pi}{4}} \cdot v_{mod(m'_2,N_vO_2)} \otimes h_{mod(m'_1,N_hO_1)} - e^{j\frac{3\pi}{4}} \cdot v_{mod(m_2,N_vO_2)} \otimes h_{mod(m_1,N_hO_1)} - e^{j\frac{3\pi}{4}} \cdot v_{mod(m'_2,N_vO_2)} \otimes h_{mod(m'_1,N_hO_1)} \\ e^{j\frac{3\pi}{4}} v_{mod(m_2,N_vO_2)} \otimes h_{mod(m_1,N_hO_1)} - e^{j\frac{3\pi}{4}} v_{mod(m'_2,N_vO_2)} \otimes h_{mod(m'_1,N_hO_1)} - e^{j\frac{3\pi}{4}} \cdot v_{mod(m_2,N_vO_2)} \otimes h_{mod(m_1,N_hO_1)} e^{j\frac{3\pi}{4}} \cdot v_{mod(m'_2,N_vO_2)} \otimes h_{mod(m'_1,N_hO_1)} \end{bmatrix}$$

$$\overline{W}^{(4)}_{(m_1,m_2,m'_1,m'_2)} = \frac{1}{\sqrt{4N_hN_v \cdot r}} \cdot$$

$$\begin{bmatrix} v_{mod(m_2,N_vO_2)} \otimes h_{mod(m_1,N_hO_1)} v_{mod(m'_2,N_vO_2)} \otimes h_{mod(m'_1,N_hO_1)} v_{mod(m_2,N_vO_2)} \otimes h_{mod(m_1,N_hO_1)} v_{mod(m'_2,N_vO_2)} \otimes h_{mod(m'_1,N_hO_1)} \\ j \cdot v_{mod(m_2,N_vO_2)} \otimes h_{mod(m_1,N_hO_1)} - j \cdot v_{mod(m'_2,N_vO_2)} \otimes h_{mod(m'_1,N_hO_1)} j \cdot v_{mod(m_2,N_vO_2)} \otimes h_{mod(m_1,N_hO_1)} - j \cdot v_{mod(m'_2,N_vO_2)} \otimes h_{mod(m'_1,N_hO_1)} \\ e^{j\frac{\pi}{4}} \cdot v_{mod(m_2,N_vO_2)} \otimes h_{mod(m_1,N_hO_1)} e^{j\frac{\pi}{4}} \cdot v_{mod(m'_2,N_vO_2)} \otimes h_{mod(m'_1,N_hO_1)} - e^{j\frac{\pi}{4}} \cdot v_{mod(m_2,N_vO_2)} \otimes h_{mod(m_1,N_hO_1)} - e^{j\frac{\pi}{4}} \cdot v_{mod(m'_2,N_vO_2)} \otimes h_{mod(m'_1,N_hO_1)} \\ e^{j\frac{3\pi}{4}} v_{mod(m_2,N_vO_2)} \otimes h_{mod(m_1,N_hO_1)} - e^{j\frac{3\pi}{4}} v_{mod(m'_2,N_vO_2)} \otimes h_{mod(m'_1,N_hO_1)} - e^{j\frac{3\pi}{4}} \cdot v_{mod(m_2,N_vO_2)} \otimes h_{mod(m_1,N_hO_1)} e^{j\frac{3\pi}{4}} \cdot v_{mod(m'_2,N_vO_2)} \otimes h_{mod(m'_1,N_hO_1)} \end{bmatrix}$$

$$\hat{w}^{(4)}_{(m_1,m_2,m'_1,m'_2)} = \frac{1}{\sqrt{4N_hN_v \cdot r}} \cdot$$

$$\begin{bmatrix} v_{mod(m_2,N_vO_2)} \otimes h_{mod(m_1,N_hO_1)} v_{mod(m'_2,N_vO_2)} \otimes h_{mod(m'_1,N_hO_1)} v_{mod(m_2,N_vO_2)} \otimes h_{mod(m_1,N_hO_1)} v_{mod(m'_2,N_vO_2)} \otimes h_{mod(m'_1,N_hO_1)} \\ j \cdot v_{mod(m_2,N_vO_2)} \otimes h_{mod(m_1,N_hO_1)} - j \cdot v_{mod(m'_2,N_vO_2)} \otimes h_{mod(m'_1,N_hO_1)} j \cdot v_{mod(m_2,N_vO_2)} \otimes h_{mod(m_1,N_hO_1)} - j \cdot v_{mod(m'_2,N_vO_2)} \otimes h_{mod(m'_1,N_hO_1)} \\ e^{j\frac{3\pi}{4}} \cdot v_{mod(m_2,N_vO_2)} \otimes h_{mod(m_1,N_hO_1)} e^{j\frac{3\pi}{4}} \cdot v_{mod(m'_2,N_vO_2)} \otimes h_{mod(m'_1,N_hO_1)} - e^{j\frac{3\pi}{4}} \cdot v_{mod(m_2,N_vO_2)} \otimes h_{mod(m_1,N_hO_1)} - e^{j\frac{3\pi}{4}} \cdot v_{mod(m'_2,N_vO_2)} \otimes h_{mod(m'_1,N_hO_1)} \\ e^{j\frac{5\pi}{4}} v_{mod(m_2,N_vO_2)} \otimes h_{mod(m_1,N_hO_1)} - e^{j\frac{5\pi}{4}} v_{mod(m'_2,N_vO_2)} \otimes h_{mod(m'_1,N_hO_1)} - e^{j\frac{5\pi}{4}} \cdot v_{mod(m_2,N_vO_2)} \otimes h_{mod(m_1,N_hO_1)} e^{j\frac{5\pi}{4}} \cdot v_{mod(m'_2,N_vO_2)} \otimes h_{mod(m'_1,N_hO_1)} \end{bmatrix}$$

The phase adjustment matrix V' may be $$V' \in \left\{ \frac{1}{\sqrt{2}} \begin{bmatrix} 1 & 1 \\ 1 & -1 \end{bmatrix} \quad \frac{1}{\sqrt{2}} \begin{bmatrix} 1 & 1 \\ j & -j \end{bmatrix} \right\},$$

and the phase adjustment matrix U may be $$U \in \left\{ \frac{1}{\sqrt{2}} \begin{bmatrix} 1 & 1 \\ e^{j\frac{\pi}{4}} & -e^{j\frac{\pi}{4}} \end{bmatrix} \quad \frac{1}{\sqrt{2}} \begin{bmatrix} 1 & 1 \\ e^{j\frac{3\pi}{4}} & -e^{j\frac{3\pi}{4}} \end{bmatrix} \right\}.$$

Based on the above definition of the codebook, $(i_{1,1},i_{1,2})$ is used by the first-level codebook as a first-level PMI1, and $i_2$ is used by the second-level codebook as a second-level PMI2. Different granularities of feedback frequency domains and feedback periods may be adopted by the PMI1 and the PMI2. In a possible embodiment of the present disclosure, the PMI1 is fed back in a long-time manner using a wide band, while the PMI2 is fed back in a short-term manner using a subband. The base station may determine the precoding matrix for the data transmission in accordance with the feedback of the two levels of codebooks.

Second Embodiment

As shown in FIG. 5, the present disclosure further provides in this embodiment a CSI feedback method implemented by an access device, which includes: Step S501 of receiving a first precoding matrix index value and a second precoding matrix index value from a UE, the first precoding matrix index value corresponding to a first precoding matrix $W_1$ in a set of first precoding matrices determined by the UE, the first precoding matrix $W_1$ consisting of beam groups for a plurality of antenna groups of an antenna array; the second precoding matrix index value corresponding to a second precoding matrix $W_2$ in a set of second precoding matrices determined by the UE, the second precoding matrix $W_2$ including a beam selection section for selecting beams from the beam groups for each antenna group and a phase adjustment section for adjusting phases among the plurality of antenna groups; and Step S502 of selecting corresponding precoding matrices from the set of first precoding matrices and the set of second precoding matrices in accordance with the first precoding matrix index value and the second precoding matrix index value, and implementing calculation on the selected precoding matrices to obtain a precoding matrix W for data transmission, where $W=W_1 \cdot W_2$.

In a possible embodiment of the present disclosure, the CSI feedback method further includes notifying the UE of codebook parameters of the codebook. The codebook parameters include one or more of the quantities: quantity M of the antenna groups of the antenna array, a grouping mode of the antenna groups of the antenna array, the quantity $N_i$ of antenna elements in each antenna group, the quantity of rows and columns of the antenna elements in each antenna group, a sampling rate of the beams in a precoding matrix, and a constitution mode of the beam groups for each antenna group in $W_1$.

In a possible embodiment of the present disclosure, the CSI feedback method further includes: constructing a set of the first precoding matrices $W_1$ to obtain a first codebook and constructing a set of the second precoding matrices $W_2$ to obtain a second codebook; and acquiring a codebook in accordance with the matrices in the first codebook and the second codebook through calculation.

In a possible embodiment of the present disclosure, the first codebook is for describing a long-term characteristic of a channel, so it may be fed back using a wide band in a long-time manner. The second codebook is for describing a short-term characteristic of the channel, so it may be fed back using a subband in a short-term manner.

According to the CSI feedback method in the embodiment of the present disclosure, the antenna array is divided into a plurality of antenna groups. Through two levels of codebooks, it is able to achieve the beam selection in each antenna group and the phase adjustment among the antenna groups. The two levels of codebooks are capable of being fed back respectively. As a result, it is able to quantize the channel in a more accurate manner, and improve the system performance. In addition, the quantity of the antenna groups may vary along with the quantity of data streams.

Third Embodiment

Figure 6:
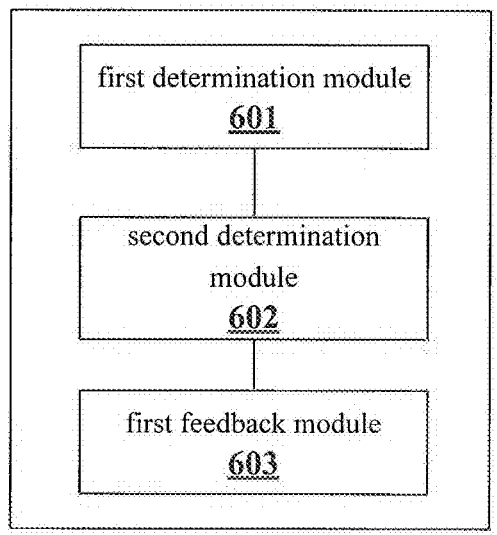
FIG. 6 is a block diagram of a CSI feedback device according to a third embodiment of the present disclosure.

As shown in FIG. 6, the present disclosure further provides in this embodiment a CSI feedback device 60, which includes: a first determination module 601 configured to determine a first precoding matrix $W_1$ in a set of first precoding matrices, and determine a first precoding matrix index value corresponding to the first precoding matrix $W_1$, the first precoding matrix $W_1$ consisting of beam groups for a plurality of antenna groups of an antenna array; a second predetermined module 602 configured to determine a second precoding matrix $W_2$ in a set of second precoding matrices, and determine a second precoding matrix index value corresponding to the second precoding matrix $W_2$, the second precoding matrix $W_2$ including a beam selection section for selecting beams from the beam groups for each antenna group and a phase adjustment section for adjusting phases among the plurality of antenna groups; and a first feedback module 603 configured to transmit the first precoding matrix index value and the second precoding matrix index value to an access device, so as to enable the access device to select corresponding precoding matrices from the set of first precoding matrices and the set of second precoding matrix in accordance with the first precoding matrix index value and the second precoding matrix index value, and calculate a precoding matrix W for data transmission in accordance with the selected precoding matrices, where $W=W_1 \cdot W_2$.

In a possible embodiment of the present disclosure, the precoding matrix W may be calculated using the following equation:

$$W = W_1 W_2 = \begin{bmatrix} X_0 & & & & 0 \\ & X_1 & & & \\ & & X_2 & & \\ & & & \ddots & \\ 0 & & & & X_{M-1} \end{bmatrix} \cdot W_2.$$

The first precoding matrix $W_1$ is a block diagonal matrix including elements of 0 other than diagonal blocks where a beam group matrix $X_i$ is located, i=0, 1, . . . , M−1, M represents the quantity of the antenna groups for the antenna array, $X_i$ represents a beam group for an $i^{th}$ antenna group and it is a $N_i \times L_i$ matrix with each column representing one beam direction, $N_i$ represents the quantity of antenna elements in the $i^{th}$ antenna group, N represents a total quantity of antenna elements for the antenna array and $$N = \sum_{i=0}^{M-1} N_i,$$

and $L_i$ represents the quantity of beams in the beam group for the $i^{th}$ antenna group. The second precoding matrix $W_2$ is configured for beam selection and phase adjustment, and it is capable of selecting several beams from each beam group and adjusting a phase among the selected beams for each antenna group, so as to acquire a final precoding matrix. The second precoding matrix $W_2$ is a $$\left(\sum_{i=0}^{M-1} L_i\right) \times r$$

matrix, where r represents a rank of the precoding matrix W.

In a possible embodiment of the present disclosure, $$W_2' = \begin{bmatrix} E_0 & & & & 0 \\ & E_1 & & & \\ & & E_2 & & \\ & & & \ddots & \\ 0 & & & & E_{M-1} \end{bmatrix} \cdot W_p,$$

where $\begin{bmatrix} E_0 & & & & 0 \\ & E_1 & & & \\ & & E_2 & & \\ & & & \ddots & \\ 0 & & & & E_{M-1} \end{bmatrix}$ represents the beam selection section and used to select $r_i$ beams from each antenna group, a beam selection vector for the $i^{th}$ antenna group is defined as $E_i=[e_{i,0}\ e_{i,1}\ \ldots\ e_{i,r_1-1}]$, where $e_{i,j}$ represents a column selection vector having a length of $L_i$ and it is configured to select one beam from the beam group matrix $X_i$ or merge the beams in $X_i$ into one beam, $j=0, 1, \ldots r_1-1$, $W_p$ represents the phase adjustment section, and r columns of $W_2'$ are selected as the second precoding matrix $W_2$.

In a possible embodiment of the present disclosure, when the $r_1$ beams are orthogonal to each other, $W_p=U\otimes I_{r_1}$, where U represents an orthogonal matrix including $r_2$ columns, each column includes M phase adjustment factors, $r_2$ is a minimum integer greater than or equal to $$\frac{r}{r_1},$$

$I_{r_1}$ represents a $r_1 \times r_1$ unit matrix. When the $r_1$ beams are not orthogonal to each other, every $r_1$ groups of M antenna groups form $$\frac{M}{r_1}$$

superior groups, and $W_p=U\otimes V$, where U represents an orthogonal matrix for adjusting a phase among the superior groups and including $r_2$ columns, each column includes $$\frac{M}{r_1}$$

phase adjustment factors, $r_2$ is a minimum integer greater than or equal to $$\frac{r}{r_1},$$

V is used for adjusting a phase among the antenna groups in one superior group and $V=[V'(:,1)\otimes e_{r_1}^{(1)}\ V'(:,2)\otimes e_{r_1}^{(2)}\ \ldots\ V'(:,r_1)\otimes e_{r_1}^{(r_1)}]$, V' represents an orthogonal matrix including $r_1$ columns, each column includes $r_1$ phase adjustment factors, $V'(:,i)$ represents an $i^{th}$ column of V', and $e_{r_1}^{(i)}$ represents an $i^{th}$ column of a unit matrix $I_{r_1 \times r_1}$.

In a possible embodiment of the present disclosure, the quantity M of the antenna groups of the antenna array varies along with the rank r of the precoding matrix W.

In a possible embodiment of the present disclosure, the CSI feedback device further includes a first codebook parameter processing module configured to acquire a channel measurement result, determine codebook parameters of a codebook in accordance with the channel measurement result, and transmit the codebook parameters to the access device, or determine one or more parameters corresponding to the codebook parameters in accordance with a predetermined mapping relationship between the codebook parameters and the one or more parameters and transmit the one or more parameters to the access device. A set of the first precoding matrices $W_1$ form a first codebook, a set of the second precoding matrices $W_2$ form a second codebook, and a set of the precoding matrices for data transmission acquired after the calculation form the codebook.

In a possible embodiment of the present disclosure, the CSI feedback device further includes a second codebook parameter processing module configured to receive one or more parameters from the access device, and determine codebook parameters corresponding to the one or more parameters in accordance with a predetermined mapping relationship between the codebook parameters and the one or more parameters or receive all the codebook parameters from the access device.

In a possible embodiment of the present disclosure, the codebook parameters include one or more of the quantities: quantity M of the antenna groups of the antenna array, a grouping mode of the antenna groups of the antenna array, the quantity $N_t$ of the antenna elements in each antenna group, the quantity of rows and columns of the antenna elements in each antenna group, a sampling rate of the beams in a precoding matrix, and a constitution mode of the beam groups for each antenna group in $W_1$ (a beam configuration mode).

According to the CSI feedback device in the embodiment of the present disclosure, the antenna array is divided into a plurality of antenna groups. Through two levels of codebooks, it is able to achieve the beam selection in each antenna group and the phase adjustment among the antenna groups. The two levels of codebooks are capable of being fed back respectively. As a result, it is able to quantize the channel in a more accurate manner, and improve the system performance. In addition, the quantity of the antenna groups may vary along with the quantity of data streams.

Fourth Embodiment

Figure 7:
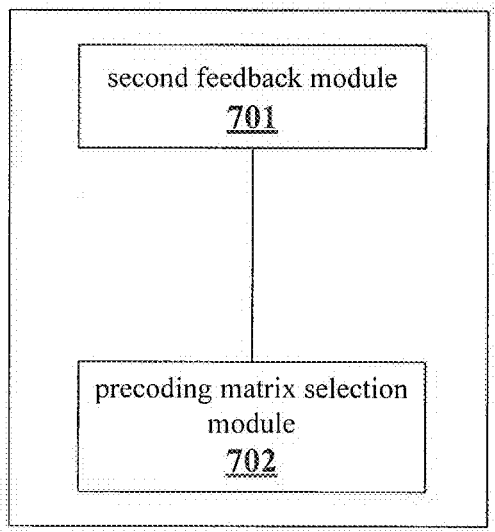
FIG. 7 is a block diagram of a CSI feedback device according to a fourth embodiment of the present disclosure.

As shown in FIG. 7, the present disclosure further provides in this embodiment a CSL feedback device 70, which includes: a second feedback module 701 configured to receive a first precoding matrix index value and a second precoding matrix index value from a UE, the first precoding matrix index value corresponding to a first precoding matrix $W_1$ in a set of first precoding matrices determined by the UE, the first precoding matrix $W_1$ consisting of beam groups for a plurality of antenna groups of an antenna array, the second precoding matrix index value corresponding to a second precoding matrix $W_2$ in a set of second precoding matrices determined by the UE, the second precoding matrix $W_2$ including a beam selection section for selecting beams from the beam groups for each antenna group and a phase adjustment section for adjusting phases among the plurality of antenna groups; and a precoding matrix selection module 702 configured to select corresponding precoding matrices from the set of first precoding matrices and the set of second precoding matrices in accordance with the first precoding matrix index value and the second precoding matrix index value, and calculate a precoding matrix W for data transmission in accordance with the selected precoding matrices, where $W=W_1 \cdot W_2$.

In a possible embodiment of the present disclosure, the CSI feedback device further includes a third feedback module configured to notify the UE of codebook parameters of a codebook. The codebook parameters include one or more of the quantities: quantity M of the antenna groups of the antenna array, a grouping mode of the antenna groups of the antenna array, the quantity $N_t$ of antenna elements in each antenna group, the quantity of rows and columns of the antenna elements in each antenna group, a sampling rate of the beams in a precoding matrix, and a constitution mode of the beam groups for each antenna group in $W_1$. A set of the first precoding matrices $W_1$ form a first codebook, a set of the second precoding matrices $W_2$ form a second codebook, and a set of the precoding matrices for data transmission acquired after the calculation form the codebook.

According to the CSI feedback device in the embodiment of the present disclosure, the antenna array is divided into a plurality of antenna groups. Through two levels of codebooks, it is able to achieve the beam selection in each antenna group and the phase adjustment among the antenna groups. The two levels of codebooks are capable of being fed back respectively. As a result, it is able to quantize the channel in a more accurate manner, and improve the system performance. In addition, the quantity of the antenna groups may vary along with the quantity of data streams.

It should be appreciated that, such phrases as "one embodiment" or "one of the embodiments" intend to indicate that the specific features, structures or characteristics are contained in at least one embodiment the present disclosure, rather than referring to a same embodiment. In addition, the features, structures or characteristics may be combined in any embodiment or embodiments in an appropriate manner.

In the embodiments of the present disclosure, the order of the steps may not be limited to the serial numbers thereof, and it shall be determined on the basis of the functions and internal logic.

It should be further appreciated that, the device and method may be implemented in any other ways. For example, the embodiments for the apparatus is merely for illustrative purposes, and the modules or units are provided merely on the basis of their logic functions. During the actual application, some modules or units may be combined together or integrated into another system. Alternatively, some functions of the module or units may be omitted or not executed. In addition, the coupling connection, direct coupling connection or communication connection between the modules or units may be implemented via interfaces, and the indirect coupling connection or communication connection between the modules or units may be implemented in an electrical or mechanical form or in any other form.

In addition, the functional units in the embodiments of the present disclosure may be integrated into a processing unit, or the functional units may exist independently, or two or more functional units may be combined together. These units may be implemented in the form of hardware, or in the form of hardware plus software functional units.

The software functional units may be stored in a computer-readable storage medium, and may include several instructions so as to enable a computer device (a personal computer, a server or a network device) to execute parts of the steps of the method mentioned in the embodiments of the present disclosure. The storage medium may include any medium capable of storing therein program codes, e.g., a universal serial bus (USB) flash disk, a mobile hard disk (HD), a read-only memory (ROM), a random access memory (RAM), a magnetic disk or an optical disk.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A Channel State Information (CSI) feedback method, comprising:
   determining a first precoding matrix $W_1$ in a set of first precoding matrices, and determining a first precoding matrix index value corresponding to the first precoding matrix $W_1$, the first precoding matrix $W_1$ consisting of beam groups for a plurality of antenna groups of an antenna array;
   determining a second precoding matrix $W_2$ in a set of second precoding matrices, and determining a second precoding matrix index value corresponding to the second precoding matrix $W_2$, the second precoding matrix $W_2$ comprising a beam selection section for selecting beams from the beam groups for each antenna group and a phase adjustment section for adjusting phases among the plurality of antenna groups; and
   feeding back the first precoding matrix index value and the second precoding matrix index value to an access device, selecting, by the access device, corresponding precoding matrices from the set of first precoding matrices and the set of second precoding matrix in accordance with the first precoding matrix index value and the second precoding matrix index value, and implementing calculation on the selected precoding matrices to obtain a preceding matrix W for data transmission,
   wherein the precoding matrix W is calculated using the following equation:

$$W = W_1 W_2 = \begin{bmatrix} X_0 & & & & 0 \\ & X_1 & & & \\ & & X_2 & & \\ & & & \ddots & \\ 0 & & & & X_{M-1} \end{bmatrix} \cdot W_2;$$

the first precoding matrix $W_1$ is a block diagonal matrix comprising elements of 0 other than diagonal blocks where a beam group matrix $X_i$ is located, i=0, 1, $\Lambda$, M−1, M represents the quantity of the antenna groups for the antenna array, $X_i$ represents a beam group for an $i^{th}$ antenna group and it is a $N_i \times L_i$ matrix with each column representing one beam direction, $N_i$ represents the quantity of antenna elements in the $i^{th}$ antenna group, N represents a total quantity of antenna elements for the antenna array and $$N = \sum_{i=0}^{M-1} N_i,$$

and $L_i$ represents the quantity of beams in the beam group for the $i^{th}$ antenna group;
the second precoding matrix $W_2$ is used for beam selection and phase adjustment, and it is capable of selecting several beams from each beam group and adjusting phases among the selected beams for each antenna group, to acquire a final precoding matrix; and
the second precoding matrix $W_2$ is a $$\left(\sum_{i=0}^{M-1} L_i\right) \times r$$

matrix, where r represents a rank of the precoding matrix W.

2. The CSI feedback method according to claim 1, wherein $$W'_2 = \begin{bmatrix} E_0 & & & & 0 \\ & E_1 & & & \\ & & E_2 & & \\ & & & O & \\ 0 & & & & E_{M-1} \end{bmatrix} \cdot W_p, \text{ where } \begin{bmatrix} E_0 & & & & 0 \\ & E_1 & & & \\ & & E_2 & & \\ & & & O & \\ 0 & & & & E_{M-1} \end{bmatrix}$$

represents the beam selection section and is to select $r_1$ beams from each antenna group, a beam selection vector for the $i^{th}$ antenna group is defined as $E_i=[e_{i,0} \ e_{i,1} \wedge e_{i,r_1-1}]$, where $e_{i,j}$ represents a column selection vector having a length of $L_i$ and it is to select one beam from the beam group matrix $X_i$ or merge the beams in $X_i$ into one beam, $j=0, 1, \ldots r_1-1$, $W_p$ represents the phase adjustment section, and r columns of $W_2$ are selected as the second precoding matrix $W_2$.

3. The CSI feedback method according to claim 2, wherein when the $r_1$ beams are orthogonal to each other, $W_p = U \otimes I_{r_1}$, where U represents an orthogonal matrix comprising $r_2$ columns, each column comprises M phase adjustment factors, $r_2$ is a minimum integer greater than or equal to $$\frac{r}{r_1},$$

$I_{r_1}$ represents a $r_1 \times r_1$ unit matrix; and
when the $r_1$ beams are not orthogonal to each other, every $r_1$ groups of M antenna groups form $$\frac{M}{r_1}$$

superior groups, and $W_p = U \otimes V$, where U represents an orthogonal matrix for adjusting phases among the superior groups and comprising $r_2$ columns, each column comprises $$\frac{M}{r_1}$$

phase adjustment factors, $r_2$ is a minimum integer greater than or equal to $$\frac{r}{r_1},$$

V is used for adjusting phases among the antenna groups in one superior group and $V=[V'(:,1) \otimes e_{r_1}^{(1)} \ V'(:,2) \otimes e_{r_1}^{(2)} \wedge V'(:,r_1) \otimes e_{r_1}^{(r_1)}]$, V' represents an orthogonal matrix comprising $r_1$ columns, each column comprises $r_1$ phase adjustment factors, $V'(:,i)$ represents an $i^{th}$ column of V', and $e_{r_1}^{(i)}$ represents an $i^{th}$ column of a unit matrix $I_{r_1 \times r_1}$.

4. The CSI feedback method according to claim 1, wherein the quantity M of the antenna groups of the antenna array varies along with the rank r of the precoding matrix W.

5. The CSI feedback method according to claim 1, further comprising:

acquiring a channel measurement result, and determining codebook parameters of a codebook in accordance with the channel measurement result, a set of the first precoding matrices $W_1$ forming a first codebook, a set of the second precoding matrices $W_2$ forming a second codebook, a set of the precoding matrices for data transmission acquired after the calculation forming the codebook; and feeding back the codebook parameters to the access device, or determining one or more parameters corresponding to the codebook parameters in accordance with a predetermined mapping relationship between the codebook parameters and the one or more parameters and feeding back the one or more parameters to the access device.

6. The CSI feedback method according to claim 1, further comprising:

receiving one or more parameters from the access device; and determining codebook parameters corresponding to the one or more parameters in accordance with a predetermined mapping relationship between the codebook parameters and the one or more parameters, or receiving all the codebook parameters from the access device.

7. The CSI feedback method according to claim 5, wherein the codebook parameters comprise one or more of the quantities: quantity M of the antenna groups of the antenna array, a grouping mode of the antenna groups of the antenna array, the quantity $N_i$ of the antenna elements in each antenna group, the quantity of rows and columns of the antenna elements in each antenna group, a sampling rate of the beams in the precoding matrix, and a constitution mode of the beam groups for each antenna group in $W_1$.

8. A Channel State Information (CSI) feedback method, comprising:

receiving a first precoding matrix index value and a second precoding matrix index value from a User Equipment (UE), the first precoding matrix index value corresponding to a first precoding matrix $W_1$ in a set of first precoding matrices determined by the UE, the first precoding matrix $W_1$ consisting of beam groups for a plurality of antenna groups of an antenna array, the second precoding matrix index value corresponding to a second precoding matrix $W_2$ in a set of second precoding matrices determined by the UE, the second precoding matrix $W_2$ comprising a beam selection section for selecting beams from the beam groups for each antenna group and a phase adjustment section for adjusting phases among the plurality of antenna groups; and selecting corresponding precoding matrices from the set of first precoding matrices and the set of second precoding matrices in accordance with the first precoding matrix index value and the second precoding matrix index value, and implementing calculation on the selected precoding matrices to obtain a precoding matrix W for data transmission, wherein the precoding matrix W is calculated using the following equation:

$$W = W_1 W_2 = \begin{bmatrix} X_0 & & & & 0 \\ & X_1 & & & \\ & & X_3 & & \\ & & & O & \\ 0 & & & & X_{M-1} \end{bmatrix} \cdot W_2;$$

the first precoding matrix $W_1$ is a block diagonal matrix comprising elements of 0 other than diagonal blocks where a beam group matrix $X_i$ is located, i=0, 1, Λ, M−1, M represents the quantity of the antenna groups for the antenna array, $X_i$ represents a beam group for an $i^{th}$ antenna group and it is a $N_i \times L_i$ matrix with each column representing one beam direction, $N_i$ represents the quantity of antenna elements in the $i^{th}$ antenna group, N represents a total quantity f antenna elements for the antenna array and $$N = \sum_{i=0}^{M-1} N_i,$$

and $L_i$ represents the quantity of beams in the beam group for the $i^{th}$ antenna group;
the second precoding matrix $W_2$ is used for beam selection and phase adjustment, and it is capable of selecting several beams from each beam group and adjusting phases among the selected beams for each antenna group, to acquire a final precoding matrix; and
the second precoding matrix $W_2$ is a $$\left(\sum_{i=0}^{M-1} L_i\right) \times r$$

matrix, where r represents a rank of the precoding matrix W.

9. The CSI feedback method according to claim 8, further comprising:
constructing a set of the first precoding matrices $W_1$ to obtain a first codebook and constructing a set of the second precoding matrices $W_2$ to obtain a second codebook; and
acquiring a codebook in accordance with the matrices in the first codebook and the second codebook through calculation.

10. The CSI feedback method according to claim 9, further comprising notifying the UE of codebook parameters of the codebook, wherein the codebook parameters comprise one or more of the quantities: quantity M of the antenna groups of the antenna array, a grouping mode of the antenna groups of the antenna array, the quantity $N_i$ of antenna elements in each antenna group, the quantity of rows and columns of the antenna elements in each antenna group, a sampling rate of the beams in the precoding matrix, and a constitution mode of the beam groups for each antenna group in $W_1$.

11. A Channel State Information (CSI) feedback device, comprising:
a processor;
a memory connected to the processor via a bus interface and configured to store therein programs and data for the operation of the processor; and
a transceiver connected to the processor and the memory via the bus interface, and configured to receive and transmit data,
wherein the processor is configured to call and execute the programs and data stored in the memory, so as to:
determine a first precoding matrix $W_1$ in a set of first precoding matrices, and determine a first precoding matrix index value corresponding to the first precoding matrix $W_1$, the first precoding matrix $W_1$ consisting of beam groups for a plurality of antenna groups of an antenna array;
determine a second precoding matrix $W_2$ in a set of second precoding matrices, and determine a second precoding matrix index value corresponding to the second precoding matrix $W_2$, the second precoding matrix $W_2$ comprising a beam selection section for selecting beams from the beam groups for each antenna group and a phase adjustment section for adjusting phases among the plurality of antenna groups; and
feed back the first precoding matrix index value and the second precoding matrix index value to an access device, so that the access device selects corresponding precoding matrices from the set of first precoding matrices and the set of second precoding matrix in accordance with the first precoding matrix index value and the second precoding matrix index value, and implements calculation on the selected precoding matrices to obtain a precoding matrix W for data transmission,
wherein the precoding matrix W is calculated using the following equation:

$$W = W_1 W_2 = \begin{bmatrix} X_0 & & & & 0 \\ & X_1 & & & \\ & & X_2 & & \\ & & & O & \\ 0 & & & & X_{M-1} \end{bmatrix} \cdot W_2;$$

the first precoding matrix $W_1$ is a block diagonal matrix comprising elements of 0 other than diagonal blocks where a beam group matrix $X_i$ is located, i=0, 1, Λ, M−1, M represents the quantity of the antenna groups for the antenna array, $X_i$ represents a beam group for an $i^{th}$ antenna group and it is a $N_i \times L_i$ matrix with each column representing one beam direction, $N_i$ represents the quantity of antenna elements in the $i^{th}$ antenna group, N represents a total quantity of antenna elements for the antenna array and $$N = \sum_{i=0}^{M-1} N_i,$$

and $L_i$ represents the quantity of beams in the beam group for the $i^{th}$ antenna group;
the second precoding matrix $W_2$ is used for beam selection and phase adjustment, and it is capable of selecting several beams from each beam group and adjusting phases among the selected beams for each antenna group, to acquire a final precoding matrix; and the second precoding matrix $W_2$ is a $$\left(\sum_{i=0}^{M-1} L_i\right) \times r$$

matrix where r represents a rank of the precoding matrix W.

12. The CSI feedback device according to claim 11, wherein $$W_2' = \begin{bmatrix} E_0 & & & & 0 \\ & E_1 & & & \\ & & E_2 & & \\ & & & O & \\ 0 & & & & E_{M-1} \end{bmatrix} \cdot W_p, \text{ where } \begin{bmatrix} E_0 & & & & 0 \\ & E_1 & & & \\ & & E_2 & & \\ & & & O & \\ 0 & & & & E_{M-1} \end{bmatrix}$$

represents the beam selection section and is to select $r_1$ beams from each antenna group, a beam selection vector for the $i^{th}$ antenna group is defined as $E_i = [e_{i,0} \ e_{i,1} \ \wedge \ e_{i,r_1-1}]$, where $e_{i,j}$ represents a column selection vector having a length of $L_i$ and it is to select one beam from the beam group matrix $X_i$ or merge the beams in $X_i$ into one beam, $j=0, 1, \ldots r_1-1$, $W_p$ represents the phase adjustment section, and r columns of $W_2$ are selected as the second precoding matrix $W_2$.

13. The CSI feedback device according to claim 12, wherein when the $r_1$ beams are orthogonal to each other, $W_p = U \otimes I_{r_1}$, where U represents an orthogonal matrix comprising $r_2$ columns, each column comprises M phase adjustment factors, $r_2$ is a minimum integer greater than or equal to $$\frac{r}{r_1},$$

$I_{r_1}$ represents a $r_1 \times r_1$ unit matrix; and
when the $r_1$ beams are not orthogonal to each other, every $r_1$ groups of M antenna groups form $$\frac{M}{r_1}$$

superior groups, and $W_p = U \otimes V$, where U represents an orthogonal matrix for adjusting phases among the superior groups and comprising $r_2$ columns, each column comprises $$\frac{M}{r_1}$$

phase adjustment factors, $r_2$ is a minimum integer greater than or equal $$\frac{r}{r_1},$$

V is for adjusting phases among the antenna groups in one superior group and $V = [V'(:,1) \otimes e_{r_1}^{(1)} \ V'(:,2) \otimes e_{r_1}^{(2)} \ \wedge \ V'(:,r_1) \otimes e_{r_1}^{(r_1)}]$, V' represents an orthogonal matrix comprising $r_1$ columns, each column comprises $r_1$ phase adjustment factors, $V'(:,i)$ represents an $i^{th}$ column of V' and $e_{r_1}^{(i)}$ represents an $i^{th}$ column of a unit matrix $I_{r_1 \times r_1}$.

14. The CSI feedback device according to claim 11, wherein the quantity M of the antenna groups of the antenna array varies along with the rank r of the precoding matrix W.

15. The CSI feedback device according to claim 11, further comprising a first codebook parameter processing module configured to acquire a channel measurement result, determine codebook parameters of a codebook in accordance with the channel measurement result, and feed back the codebook parameters to the access device, or determine one or more parameters corresponding to the codebook parameters in accordance with a predetermined mapping relationship between the codebook parameters and the one or more parameters and feed back the one or more parameters to the access device, wherein a set of the first precoding matrices $W_1$ form a first codebook, a set of the second precoding matrices $W_2$ form a second codebook, and a set of the precoding matrices for data transmission acquired after the calculation form the codebook.

16. The CSI feedback device according to claim 11, further comprising a second codebook parameter processing module configured to receive one or more parameters from the access device, and determine codebook parameters corresponding to the one or more parameters in accordance with a predetermined mapping relationship between the codebook parameters and the one or more parameters or receive all the codebook parameters from the access device.

17. The CSI feedback device according to claim 15, wherein the codebook parameters comprise one or more of the quantities: quantity M of the antenna groups of the antenna array, a grouping mode of the antenna groups of the antenna array, the quantity $N_i$ of the antenna elements in each antenna group, the quantity of rows and columns of the antenna elements in each antenna group, a sampling rate of the beams in the precoding matrix, and a constitution mode of the beam groups for each antenna group in $W_1$.

18. A Channel State Information (CSI) feedback device, comprising:
   a processor;
   a memory connected to the processor via a bus interface and configured to store therein programs and data for the operation of the processor; and
   a transceiver connected to the processor and the memory via the bus interface, and configured to receive and transmit data,
   wherein the processor is configured to call and execute the programs and data stored in the memory, so as to:
   receive a first precoding matrix index value and a second precoding matrix index value from a User Equipment (UE), the first precoding matrix index value corresponding to a first precoding matrix $W_1$ in a set of first precoding matrices determined by the UE, the first precoding matrix $W_1$ consisting of beam groups for a plurality of antenna groups of an antenna array, the second precoding matrix index value corresponding to a second precoding matrix $W_2$ in a set of second precoding matrices determined by the UE, the second precoding matrix $W_2$ comprising a beam selection section for selecting beams from the beam groups for each antenna group and a phase adjustment section for adjusting phases among the plurality of antenna groups; and select corresponding precoding matrices from the set of first precoding matrices and the set of second precoding matrices in accordance with the first precoding matrix index value and the second precoding matrix index value, and implement calculation on the selected precoding matrices to obtain a precoding matrix W for data transmission, wherein the precoding matrix W is calculated using the following equation:

$$W = W_1 W_2 = \begin{bmatrix} X_0 & & & & 0 \\ & X_1 & & & \\ & & X_2 & & \\ & & & O & \\ 0 & & & & X_{M-1} \end{bmatrix} \cdot W_2;$$

the first precoding matrix $W_1$ is a block diagonal matrix comprising elements of 0 other than diagonal blocks where a beam group matrix $X_i$ is located, i=0, 1, Λ, M−1, M represents the quantity of the antenna groups for the antenna array, $X_i$ represents a beam group for an $i^{th}$ antenna group and it is a $N_i \times L_i$ matrix with each column representing one beam direction, $N_i$ represents the quantity of antenna elements in the $i^{th}$ antenna group, N represents a total quantity of antenna elements for the antenna array and $$N = \sum_{i=0}^{M-1} N_i,$$

and $L_i$ represents the quantity of beams in the beam group for the $i^{th}$ antenna group;

the second precoding matrix $W_2$ is used for beam selection and phase adjustment, and it is capable of selecting several beams from each beam group and adjusting phases among the selected beams for each antenna group, to acquire a final precoding matrix; and the second precoding matrix $W_2$ is a $$\left(\sum_{i=0}^{M-1} L_i\right) \times r$$

matrix, where r represents a rank of the precoding matrix W.

* * * * *